United States Patent
Kato

(10) Patent No.: US 6,469,803 B1
(45) Date of Patent: Oct. 22, 2002

(54) COMMUNICATION APPARATUS

(75) Inventor: Tokunori Kato, Ichinomiya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/114,181

(22) Filed: Jul. 13, 1998

(30) Foreign Application Priority Data

Jul. 14, 1997 (JP) .............................................. 9-188691

(51) Int. Cl.$^7$ ................................................. G06K 1/00
(52) U.S. Cl. ........................ 358/1.9; 358/1.4; 358/1.6; 358/1.14
(58) Field of Search .......................... 358/1.9, 1.6, 1.4, 358/1.15, 1.14; 379/7, 23, 14

(56) References Cited

U.S. PATENT DOCUMENTS

| | | | |
|---|---|---|---|
| 5,208,902 | * 5/1993 | Kumon | 395/116 |
| 5,287,434 | * 2/1994 | Bain et al. | 395/114 |
| 5,650,804 | * 7/1997 | Kawamura et al. | 347/19 |
| 5,689,289 | * 11/1997 | Watanabe et al. | 347/7 |
| 5,798,771 | * 8/1998 | Nishii et al. | 347/7 |
| 5,805,182 | * 9/1998 | Lee | 347/35 |
| 6,003,967 | * 12/1999 | Mazaki | 347/19 |

\* cited by examiner

*Primary Examiner*—Thomas D. Lee
(74) *Attorney, Agent, or Firm*—Oliff & Berridge, PLC

(57) ABSTRACT

A communication apparatus includes a receptacle for containing a print material, a receiver for receiving an image through a communication line, a printing section for printing the received image on a recording sheet with the print material while also printing a print material supply mark at an edge portion of the recording sheet, and a detector for detecting the print material supply mark. The communication apparatus further includes a controller for selecting, in response to a user's operation, a mark-on state in which the printing section is allowed to print the print material supply mark and a mark-off state in which the printing section is prohibited from printing the print material supply mark.

31 Claims, 14 Drawing Sheets

Fig. 10A  FAX PRINT OK?

Fig. 10B  1.YES 2.NO

Fig. 15A  | PRINT BACKUP? |

Fig. 15B  | 1.YES 2.NO |

Fig. 16

ACTIVITY REPORT

TIME : 05/08/1997 13:06
NAME :
FAX :
TEL :

| DATE | TIME | FAX NO./NAME | DURATION | PAGE(S) | RESULT | COMMENT | | |
|---|---|---|---|---|---|---|---|---|
| 05/08 | 10:18 | 123 | 27 | 01 | OK | TX | ECM | |
| 05/08 | 10:29 | 123 | 04 | 01 | OK | TX | ECM | |
| 05/08 | 10:39 | 123 | 27 | 01 | OK | TX | ECM | |
| 05/08 | 10:44 | 987 | 08 | 01 | OK | TX | ECM | |
| 05/08 | 10:48 | 987 | 36 | 01 | OK | TX | ECM | |
| 05/08 | 10:51 | 7777 | 08 | 01 | OK | RX | ECM | |
| 05/08 | 10:54 | 123 | 08 | 01 | OK | TX | ECM | |
| 05/08 | 10:56 | 7777 | 01 | 01 | OK | RX | ECM | |
| 05/08 | 11:00 | 123 | 09 | 01 | OK | TX | ECM | |
| 05/08 | 11:02 | 7777 | 09 | 01 | OK | RX | ECM | |
| 05/08 | 11:07 | 7777 | 08 | 02 | OK | RX | ECM | |
| 05/08 | 11:12 | 321 | 39 | 00 | NG | TX | ECM | |
| 05/08 | 11:15 | 7777 | 02 | 01 | OK | RX | ECM | |
| 05/08 | 11:18 | 123 | 04 | 01 | OK | TX | ECM | |
| 05/08 | 11:21 | 123 | 08 | 01 | OK | TX | ECM | |
| 05/08 | 11:25 | 123 | 09 | 01 | OK | TX | ECM | |
| 05/08 | 11:27 | 7777 | 09 | 01 | OK | RX | ECM | |
| 05/08 | 11:29 | 321 | 39 | 00 | NG | TX | ECM | |
| 05/08 | 11:33 | 123 | 04 | 01 | OK | TX | ECM | |
| 05/08 | 11:36 | 123 | 08 | 01 | OK | TX | ECM | |
| 05/08 | 11:39 | 123 | 09 | 01 | OK | TX | ECM | |
| 05/08 | 11:41 | 7777 | 09 | 01 | OK | RX | ECM | |
| 05/08 | 11:51 | 654 | 39 | 00 | NG | TX | ECM | BKUP |
| 05/08 | 12:55 | 123 | 09 | 01 | OK | TX | ECM | BKUP |
| 05/08 | 13:02 | 123 | 25 | 01 | OK | TX | | BKUP |

BUSY : BUSY/NO RESPONSE
NG : POOR LINE CONDITION
CV : COVER PAGE
CA : CALL BACK MSG
POL : POLLING
RET : RETRIEVAL

Fig. 17  | PRINTING |

Fig. 18A | DELETE BACKUP? |

Fig. 18B | 1.YES 2.NO |

Fig. 19  | NO BACKUP FAX |

COMMUNICATION APPARATUS

BACKGROUND OF THE INVENTION

1. Field of the Invention

The present invention relates to a communication apparatus which is capable of receiving an image transmitted via a communication line and printing the received image on a recording paper sheet.

2. Description of the Related Art

A facsimile machine is known which is provided with an ink-jet printer. For preventing a deterioration of the printing quality due to clogging of an ink flow path (hereafter referred to as "ink clog") in such a facsimile machine, the printer is controlled to print an ink supply mark (e.g. a black dot) at the trailing edge of a recording paper sheet, and a mark sensor such as a reflection type photoelectric tube is provided to detect the ink supply mark. If the central processing unit (CPU) of the facsimile machine determines that the detection of the mark sensor shows a deterioration of the printing quality, the CPU notifies such a deterioration at a display of the facsimile machine while also shifting the operation of the facsimile machine to the memory reception mode.

However, the prior art facsimile machine is disadvantageous in that an ink supply mark (not forming a part of the fax-received image) is printed on a recording sheet unless an ink clog occurs, and the user has no option of avoiding such a printing mode. Indeed, some users consider that an ink supply mark should not be printed on a recording sheet.

Further, the prior art facsimile machine has been also found disadvantageous in that an ink supply mark may be erroneously detected by the mark sensor when disturbing light enters from outside, and that the memory for backup of the fax-received data may become readily full due to frequent memory reception of the fax data.

SUMMARY OF THE INVENTION

It is, therefore, an object of the present invention to provide a communication apparatus by which a user can optionally select whether to print an ink (print material) supply mark on each recording sheet or not.

Another object of the present invention is to provide a communication apparatus which is capable of preventing an erroneous operation even when disturbing light enters from outside before or in the course of printing a fax received image.

A further object of the present invention is to provide a communication apparatus which is capable of conveniently preventing a memory from becoming full.

Still another object of the present invention is to provide a communication apparatus which is capable of prompting the user to take appropriate actions for preventing a memory from becoming full.

According to a first aspect of the present invention, there is provided a communication apparatus comprising: a receptacle for containing a print material; a receiver for receiving an image through a communication line; a printing section for printing the received image on a recording sheet with the print material while also printing a print material supply mark at an edge portion of the recording sheet; a detecting unit for detecting the print material supply mark; and a controller for selecting, in response to a user's operation, a mark-on state in which the printing section is allowed to print the print material supply mark and a mark-off state in which the printing section is prohibited from printing the print material supply mark.

With the communication apparatus described above, the user has the option of selecting the mark-on state and the mark-off state. If the user selects the mark-off state, no ink supply mark is printed on the recording sheet for satisfying the user's preference. If the user selects the mark-on state, an ink supply mark is printed on each recording sheet for detection by the mark sensor, whereby appropriate steps may be taken at the time of an ink clog or an ink run-out.

The selection of the mark-on state or the mark-off state may be performed by operating the keys of an operation section. For instance, two specific keys of the operation section may be pressed together to switch from the mark-on state to the mark-off state or vice versa. However, such a manner of operation is not limitative.

Typically, the communication apparatus comprises a facsimile machine. Alternatively, however, the communication apparatus may be a multi-function apparatus which has a fax transmission function, a printing function, an image scanning function and a copying function under the control of a computer.

Preferably, the print material may be an ink for monochrome printing or color printing. The ink may be typically in the form of a liquid, but it may be a solid ink which is melted at the time of printing. Alternatively, the print material may be in the form of powder such as toner for electrophotographic process.

The receptacle for the print material may be a cartridge which is replaced as a unit. A plurality of cartridges may be removably mounted at the printing section for purposes of color printing. Alternatively, the receptacle may be a fixed container to which an amount of the print material is replenished at the time of exhaustion.

The communication line may comprise a public or private communication line which may be wired or wireless.

Typically, the printing section may comprise an ink jet printhead. Alternatively, the printing section may incorporate an electrophotographic process cartridge.

The print material supply mark printed by the printing section may be a black dot for example. However, the size, color and configuration of the print material supply mark may be optionally selected.

The detecting unit may comprise a reflection type photoelectric tube, but this is not limitative.

The controller may comprise a CPU of the communication apparatus which performs various function on the basis of various programs and data read out from a ROM and/or an EEPROM.

According to a preferred embodiment, the communication apparatus further comprises a memory for storing the received image, and the controller controls the memory to store the received image while the printing section is held in the mark-off state.

The memory for this purpose may comprise a RAM. However, other memory such as a flash memory or a hard disk is also usable for the storage of the backup data.

The controller is further being capable of selecting, in response to a user's operation performed in the mark-off state, a backup-on state in which the memory is controlled to store the received image and a backup-off state in which the memory is controlled not to store the received image.

According to a second aspect of the present invention, there is provided a communication apparatus comprising: a receptacle for containing a print material; a receiver for receiving an image through a communication line; a printing section for printing the received image on a recording sheet with the print material while also printing a print material supply mark at an edge portion of the recording sheet; a detecting unit for optically detecting the print material supply mark and for optically detecting disturbing light; and a controller for controlling the printing section to perform successive steps of printing the received image on the recording sheet regardless of detection by the detecting unit with respect to the print material supply mark if the detecting unit detects the disturbing light immediately before starting the printing.

The detecting unit for the second aspect of the present invention may comprise a single sensor which is commonly used for detecting the print material supply mark and the disturbing light. Alternatively, the detecting unit may comprise two different sensors; one for detecting the print material supply mark and the other for detecting the disturbing light.

Again, the communication apparatus may further comprise a memory for storing the received image as backup data. In this case, the controller selects a backup-on state and a backup-off state in response to a user's operation. In operation, the controller held in the backup-on state controls the memory to store the received image if the detecting unit detects the disturbing light immediately before starting the printing. Conversely, if the detecting unit does not detect the disturbing light immediately before starting the printing, the controller held in the backup-on state controls the memory not to store the received image. Further, the controller held in the backup-off state controls the memory not to store the received image regardless of detection by the detecting unit with respect to the disturbing light.

According to a third aspect of the present invention, there is provided a communication apparatus comprising: a receptacle for containing a print material; a receiver for receiving an image through a communication line; a memory for storing the received image as backup data; a printing section for printing the received image on a recording sheet with the print material while also printing a print material supply mark at an edge portion of the recording sheet; a detecting unit for optically detecting the print material supply mark and for optically detecting disturbing light; and a controller for controlling the printing section to stop printing the received image while controlling the memory to store the received image if the print material supply mark is not normally detected by the detecting unit in the course of the printing; wherein the controller controls the printing section to stop printing the received image while controlling the memory to store the received image regardless of detection by the detecting unit with respect to the print material supply mark if the detecting unit detects the disturbing light in the course of the printing.

According to a fourth aspect of the present invention, there is provided a communication apparatus comprising: a receptacle for containing a print material; a receiver for receiving an image through a communication line; a memory for storing the received image as backup data; a printing section for printing the received image on a recording sheet with the print material while also printing a print material supply mark at an edge portion of the recording sheet; a detecting unit for optically detecting the print material supply mark and for optically detecting disturbing light; and a controller for selecting a backup-on state and a backup-off state in response to a user's operation, the controller also selecting, in response to another user's operation, a mark-on state in which the printing section is allowed to print the print material supply mark and a mark-off state in which the printing section is prohibited from printing the print material supply mark; wherein the controller performs four different control modes in accordance with different combinations of the backup-on state, the backup-off state, the mark-on state and the mark-off state.

In a first control mode performed by the controller which is held in the backup-on state and the mark-on state, the following steps take place. If the detecting unit detects the disturbing light immediately before starting the printing, the controller controls the memory to store the received image in addition to controlling the printing section to print the received image and the print material supply mark. If the print material supply mark is normally read by the detecting unit in the absence of the disturbing light in the course of the printing, the controller controls the memory not to store the received image while controlling the printing section to print the received image and the print material supply mark. If the print material supply mark is not normally read by the detecting unit in the absence of the disturbing light in the course of the printing, the controller controls the memory to store the received image while controlling the printing section to stop printing the received image. If the detecting unit detects the disturbing light in the course of the printing, the controller controls the memory to store the received image while controlling the printing section to stop printing the received image regardless of detection by the detecting unit with respect to the print material supply mark.

In a second control mode performed by the controller which is held in the backup-off state and the mark-on state, the following steps take place. The controller controls the memory not to store the received image but controlling the printing section to print the received image and the print material supply mark regardless of detection by the detecting unit with respect to the disturbing light. If the print material supply mark is not normally read by the detecting unit in the absence of the disturbing light in the course of the printing, the controller controls the memory to store the received image while controlling the printing section to stop printing the received image and the print material supply mark.

In a third control mode performed by the controller which is held in the backup-on state and the mark-off state, the controller controls the memory to store the received image while controlling the printing section to print the received image without printing the print material supply mark regardless of detection by the detecting unit with respect to the disturbing light.

In a fourth control mode performed by the controller which is held in the backup-off state and the mark-off state, the controller controls the printing section to print the received image without printing the print material supply mark and without causing the memory to store the received image regardless of detection by the detecting unit with respect to the disturbing light.

According to a fifth aspect of the present invention, there is provided a communication apparatus comprising: a display section for displaying various kinds of information; a receptacle for containing a print material; a receiver for receiving an image through a communication line; a memory for storing the received image as backup data; a printing section for printing the received image on a recording sheet with the print material while also printing a print material supply mark at an edge portion of the recording sheet; a detecting unit for optically detecting the print material supply mark and for optically detecting disturbing light; and a controller for selecting a mark-on state in which the printing section is allowed to print the print material supply mark and a mark-off state in which the printing is section is prohibited from printing the print material supply mark; wherein the controller controls the memory to store the received image in addition to controlling the printing section to print the received image when the mark-off state is selected or when the detecting unit detects the disturbing light immediately before the printing, the controller also controlling the display section to display a print result inquiry after completion of the image reception by the receiver if the received image is stored in the memory, the controller further controlling the memory to delete the backup data in response to a print-OK input by a user.

Preferably, the communication apparatus may further comprise a cleaner for cleaning a supply path for the print material. In this case, the controller controls the cleaner to clean the supply path in response to a print-NG input by the user, and the controller also controls the printing section to print out the backup data after the cleaning.

According to a sixth aspect of the present invention, there is provided a communication apparatus comprising: a receptacle for containing a print material; a receiver for receiving an image through a communication line; a memory for storing the received image as backup data; a printing section for printing the received image on a recording sheet with the print material while also printing a print material supply mark at an edge portion of the recording sheet; a detecting unit for optically detecting the print material supply mark and for optically detecting disturbing light; and a controller for controlling the memory and the printing unit in accordance with the detection of the detecting unit; wherein the controller checks a remaining capacity of the memory before storing the received image, the controller also deleting those of the backup data which have been already printed out when the remaining capacity of the memory is found to be no more than a predetermined amount.

According to a seventh aspect of the present invention, there is provided a communication apparatus comprising: a receptacle for containing a print material; a receiver for receiving an image through a communication line; a memory for storing the received image as backup data; a printing section for printing the received image on a recording sheet with the print material while also printing a print material supply mark at an edge portion of the recording sheet; a detecting unit for optically detecting the print material supply mark and for optically detecting disturbing light; a cleaner for cleaning a supply path for the print material; and a controller for controlling the memory to store or not to store the received image in accordance with the detection of the detecting unit, the controller further controlling the printing section to print out any remainder of the of backup data the memory on the recording sheet after controlling the cleaner to clean the supply path.

Preferably, the controller selects, in response to a user's operation, a mark-on state in which the printing section is allowed to print the print material supply mark and a mark-off state in which the printing section is prohibited from printing the print material supply mark, and the controller controls the memory to store or not to store the received image in accordance with the detection of the detecting unit and the selection of the mark-on state or the mark-off state.

In one example, the controller controls the cleaner to clean the supply path in response to a user's operation.

In another example, the controller controls the cleaner to automatically clean the supply path at a predetermined time interval.

In still another example, the print material is an ink contained in an ink cartridge as the receptacle, and the controller controls the cleaner to clean the supply path automatically upon replacement of the ink cartridge.

According to an eighth aspect of the present invention, there is provided a communication apparatus comprising: a receptacle for containing a print material; a receiver for receiving an image through a communication line; a memory for storing the received image as backup data; a printing section for printing the received image on a recording sheet with the print material while also printing a print material supply mark at an edge portion of the recording sheet; a detecting unit for optically detecting the print material supply mark and for optically detecting disturbing light; a cleaner for cleaning a supply path for the print material; and a controller for selecting, in response to a user's operation, a mark-on state in which the printing section is allowed to print the print material supply mark and a mark-off state in which the printing section is prohibited from printing the print material supply mark, the controller controlling the memory to store or not to store the received image in accordance with the detection of the detecting unit and the selection of the mark-on state or the mark-off state; wherein the controller held in the mark-on state controls the printing section to print out any remainder of the backup data of the memory on the recording sheet after controlling the cleaner to clean the supply path, the controller held in the mark-off state preventing the printing section from printing out any remainder of the backup data of the memory on the recording sheet even after controlling the cleaner to clean the supply path.

According to a ninth aspect of the present invention, there is provided a communication apparatus comprising: a display section for displaying various kinds of information; a receptacle for containing a print material; a receiver For receiving an image through a communication line; a memory for storing the received image as backup data; a printing section for printing the received image on a recording sheet with the print material while also printing a print material supply mark at an edge portion of the recording sheet; a detecting unit for optically detecting the print material supply mark and for optically detecting disturbing light; and a controller for controlling the memory and the printing section in accordance with the detection of the detecting section; wherein the controller controls the display section to display a print request inquiry for asking a user whether to print out the backup data of the memory, the controller also controlling the printing section to print out the backup data when the user requests so in response to the print request inquiry.

Further, the controller may also control the display section to display a print-busy indication while the printing section prints out the backup data of the memory in response to the user's print request.

Preferably, the controller controls the display section to display a print result inquiry for asking the user as to print results after the printing section prints out the backup data in response to the user's print request. Further, the controller also controls the memory to delete the backup data when the user makes a print-OK input in response to the print result inquiry.

Advantageously, the controller controls the display section to display a deletion inquiry for asking the user whether to delete the backup data when the user requests no printing of the backup data in response to the print request inquiry. Further, the controller also controls the memory to delete the backup data when the user requests so in response to the delete inquiry.

It is additionally advantageous if the controller controls the display section to display a no-data indication when the memory stores no backup data.

Moreover, the controller may control the memory to delete the backup data if no disturbing light is detected by the detecting unit while the printing section prints out the backup data in response to the user's print request.

Other objects, features and advantages of the present invention will become apparent from the following description of the preferred embodiment given with reference to the accompanying drawings.

BRIEF DESCRIPTION OF THE DRAWINGS

In the accompanying drawings:

FIGS. 10A and 10B are views showing two different result inquiry indications displayed in the print result inquiry process;

FIGS. 15A and 15B are views showing two different print request inquiry indications displayed in the manual data deletion process;

FIG. 16 is a table showing an example of activity report which may be referred to by the user in deciding whether to print out the backup data in the manual data deletion process;

FIG. 17 is a view showing a print-busy indication displayed while printing out the backup data in the manual data deletion process;

FIGS. 18A and 18B are views showing two different deletion inquiry indications displayed in the manual data deletion process; and FIG. 19 is a view showing a no-backup indication displayed in the manual data deletion process when there is no backup data in the memory.

DETAILED DESCRIPTION OF THE PREFERRED EMBODIMENT

The preferred embodiments of the present invention will be described below with reference to the accompanying drawings.

Figure 1:
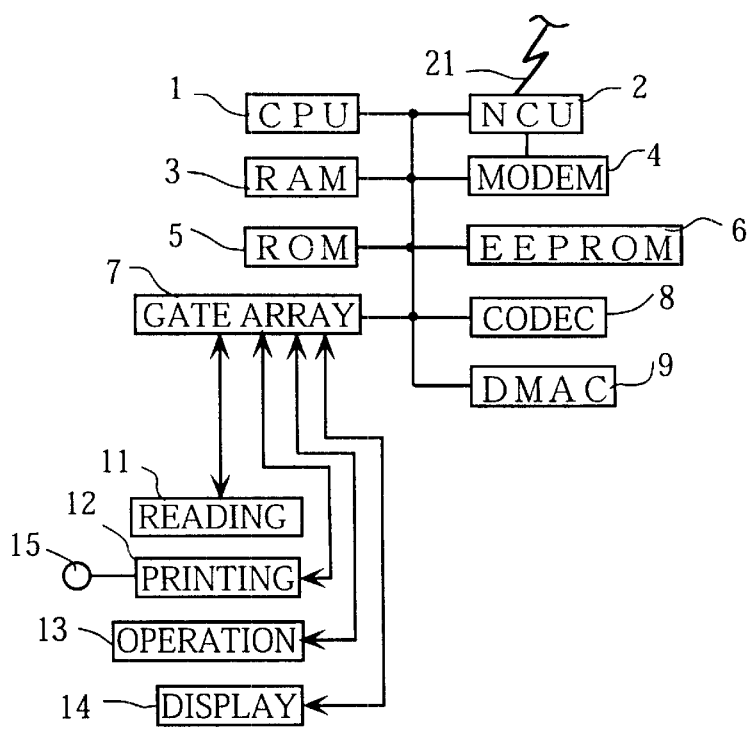
FIG. 1 is a circuit block diagram of a facsimile machine as an example of communication apparatus embodying the present invention.

Reference is first made to FIG. 1 which is a circuit block diagram showing a facsimile machine as an example of a communication apparatus embodying the present invention. This facsimile machine comprises a CPU (central processing unit) 1, an NCU (network control unit) 2, a RAM (random access memory) 3, a modem (modulator-demodulator) 4, a ROM (read-only memory) 5, an EEPROM (electrically erasable and programmable ROM) 6, a gate array 7, a codec (coder-decoder) 8, and a DMAC (direct memory access controller) 9. Further, the facsimile machine also comprises a reading section 11, a printing section 12, an operation section 13, and a display section 14.

The CPU 1, the NCU 2, the RAM 3, the modem 4, the ROM 5, the EEPROM 6, the gate array 7, the codec 8 and the DMAC 9 are connected to each other via bus lines (digital lines). The bus lines include data bus lines, address bus lines and control signal bus lines. The gate array 7 is connected to the reading section 11, the printing section 12, the operation section 13 and the display section 14, respectively.

The CPU 1 provides an overall control of the facsimile machine as a whole.

The NCU 2 is connected to a telephone line 21 for providing network control. The NCU 2 is also connected to the modem 4 and the codec 8 through an analog line, respectively.

The RAM 3, which may be provided with a power backup of a battery (e.g. a rechargeable battery), stores digital data such as fax-received data and voice data (received in an automatic answering mode). Of course, an additional RAM or RAMs may be provided to increase the capacity of data storage.

The modem 4 modulates the transmitting codes and demodulates the received codes.

The ROM 5 stores various programs or the like as required for controlling the facsimile machine, whereas the EEPROM 6 stores registered data (e.g. shortcut dials) and/or flags.

The gate array 7 functions as an I/O interface (input/output interface) for the CPU 1 for data transmission to and/or from the reading section 11, the printing section 12, the operation section 13 and the display section 14. The gate array 7 also provides analog-to-digital conversion with respect to the image signals from the reading section 11 while providing various kinds of image processing.

The codec 8 performs coding of the transmitting image data and decoding of the received image data, for example. The codec 8 also converts the pre-recorded reply message (digital voice data) from the RAM 3 into analog voice signals for supply to the NCU 2 while converting the received message (analog voice signals) from the NCU 2 into digital voice data for storage in the RAM 3.

The DMAC 9 provides memory access control with respect to the RAM 3 for data reading and writing for example.

The reading section 11 includes a light source (not shown) and an image sensor (not shown) such as a color CCD image sensor (CCD: charge-coupled device) for reading out the image data from a document (or image carrying) paper sheet (not shown). The reading section 11 also includes a plurality of rollers for transferring the document sheet.

Figure 2:
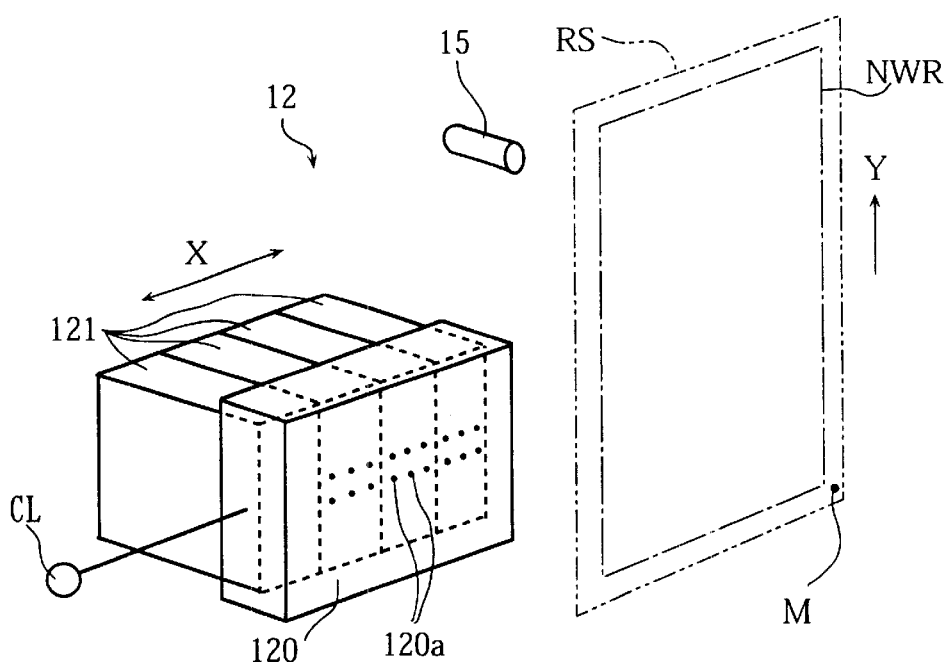
FIG. 2 is a schematic perspective view showing a printing section incorporated in the same facsimile machine.

As shown in FIG. 2, the printing section 12 may comprise a color ink jet printer for example. In the illustrated embodiment, the ink jet printer includes a printhead 120 having a plurality of nozzle ports 120a, and a plurality of ink cartridges 121 removably connected to the printhead 120. For color printing, at least three of the ink cartridges 121 contains ink of a different color, whereas one of the ink cartridges 121 contains black ink. The black ink alone may be used for performing monochrome printing. Though not shown, the printhead 120 is provided with ink flow passages and drive devices for causing the respective ink to discharge through selected ones of the nozzle ports while the printhead 120 moves in a primary scanning direction, as indicated by a double-headed arrow X. The printing section 12 functions to print received images in a normal writing region NWR of a recording sheet RS while also printing an ink supply mark M at a trailing edge of the recording sheet RS outside the normal writing region NWR. The ink supply mark M is utilized for determining whether an ink clog or ink exhaustion has occurred. Assuming now that the printing section 12 performs only monochrome printing with he use of the black ink alone, the ink supply mark M is also printed in black in the form of a small circular dot.

As also shown in FIG. 2, the printhead 120 is provided with a cleaner CL for cleaning an ink flow path extending from each ink cartridge 121 to a respective one of the nozzles 120a. A cleaning operation by the cleaner CL may be performed after replacement of an ink cartridge for example, as described hereinafter.

The printing section 12 is provided with a mark sensor 15 for detecting the ink supply mark M. The mark sensor 15 may be a reflection-type photoelectric tube. The mark sensor 15 may be also utilized for detecting incidence of disturbing light from outside.

The operation section 13 has key switches to be operated by the user for output of operation signals, whereas the display section 14 includes an LCD or the like for providing various indications under the control of the CPU 1.

The facsimile machine thus constituted operates in the following manner.

The control process of fax reception is determined according to different combinations of mark flag and backup flag stored in the EEPROM 6. Each of the mark flag and the backup flag may be selectively shifted from "On" (namely, "1") to "Off" (namely, "0") or vice versa by operating the switches of the operation section 13. For example, by pressing two specific key switches of the operation section 13 at the same time, the mark flag is switched from "On" to "Off" or from "Off" to "On". Similarly, by pressing other two specific key switches at the same time, the backup flag is also switched from "On" to "Off" or from "Off" to "On". The method for changing the mark flag is disclosed to all users through an operation manual, whereas the method for changing the backup flag is disclosed only to those users who make a specific request. This is because backup of fax-received data is desired by most users. The mark flag and the backup flag are initially set "On".

Figure 3:
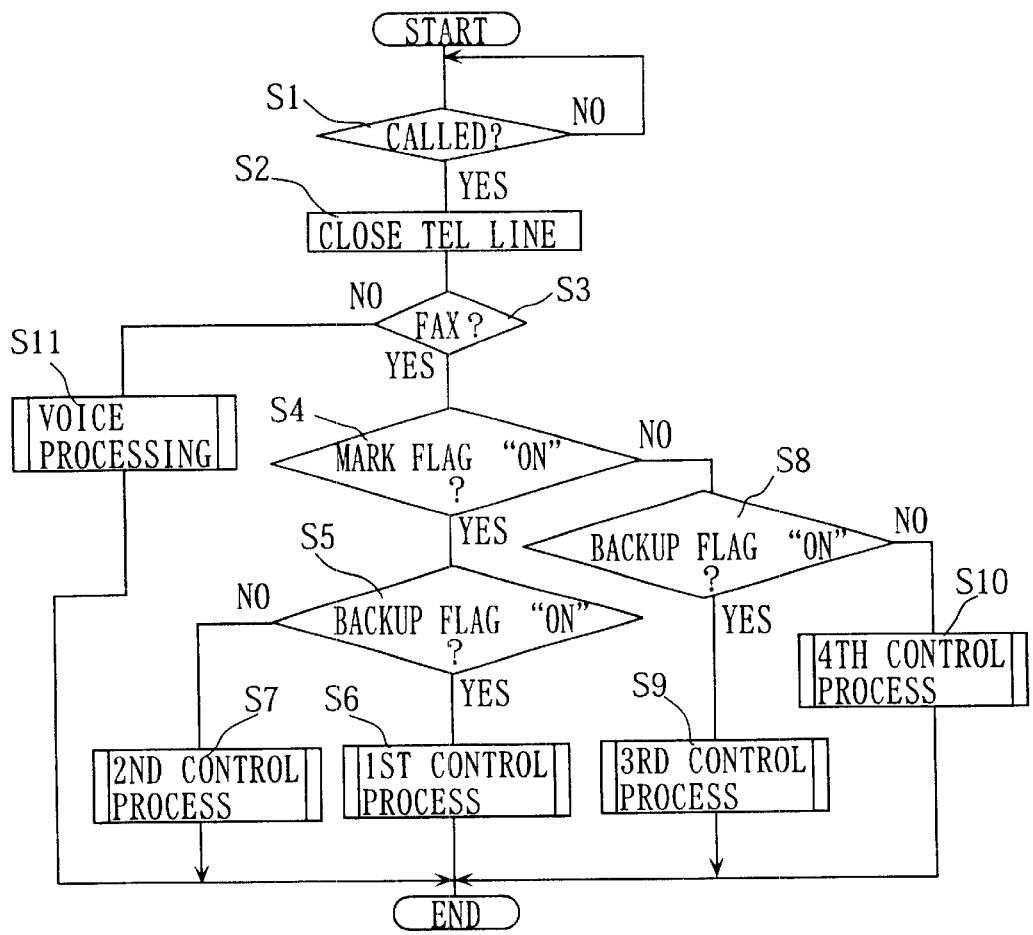
FIG. 3 is a flow diagram illustrating a fax reception process of the same facsimile machine shown.

Referring now to the flow diagram in FIG. 3, the CPU 1 determines whether a call is made to the facsimile machine (Step S1). Specifically, the CPU 1 monitors the NCU 2 for checking whether a call signal is input through the telephone line 21.

If "Yes" in Step S, the CPU 1 controls the NCU 2 to closes the line (Step S2).

Then, the CPU 1 determines whether the received call is a fax communication (Step S3). Specifically, the CPU 1 monitors the data demodulated by the modem 4 upon reception through the telephone line 21 and the NCU 2 and determines if the fax-received data are those of a fax communication.

If "Yes" in Step S3, the CPU 1 checks whether the mark flag is "On" (Step S4). Specifically, the CPU 1 reads out the mark flag from a predetermined region of the EEPROM 6 to check if the content is "1". The mark flag determines whether or not to print an ink supply mark. The mark flag is initially set "On" for shipment from a factory but may be changed to "Off" by suitably operating specific keys of the operation section 13.

If "Yes" in Step S4, the CPU 1 then checks whether the backup flag is "On" (Step S5). Specifically, the CPU 1 reads out the backup flag from a predetermined region of the EEPROM 6 to check if the content is "1". The backup flag determines whether or not to store fax-received data in the RAM 3 under a predetermined condition. The backup flag is initially set "On" but may be changed to "Off" by suitably operating the operation section 13. However, as previously described, the method for changing the backup flag is disclosed to the user only when specifically requested.

If "Yes" in Step S5, the CPU 1 executes a first control process (Step S6) and completes this process routine. The specific process of the first control process will be described later.

If the backup flag is "Off" ("No" in Step S5), the CPU 1 executes a second control process (Step S7) and completes the process routine. The specific process of the second control process will be also described later.

In Step S4, if the mark flag is "On" ("No" in Step S4), the CPU 1 determines whether the backup flag is "On" (Step S8).

If "Yes" in Step S8, the CPU 1 executes a third control process (Step S9) and completes the process routine. The specific process of the third control process will be also described later.

On the other hand, if "No" in Step S8, the CPU 1 executes a fourth control process (Step S10) and completes the process routine. The specific process of the fourth control process will be also described later.

In Step S3, if the received call is not a fax communication ("No" in Step S3), voice signals are being received. Therefore, the CPU 1 executes voice processing (Step S11) and completes the facsimile processing routine. The voice processing includes, for example, an automatic answering mode, wherein the codec 8 converts the pre-recorded reply message (digital voice data) from the RAM 3 into analog voice signals for transmission through the NCU 2 and the telephone line 21 while converting the received message (analog voice signals) from the NCU 2 into digital voice data for storage in the RAM 3. The voice processing itself is well known and therefore not described here in detail.

If there is no call in Step S1, this step is repeated to wait for a call.

Figure 4:
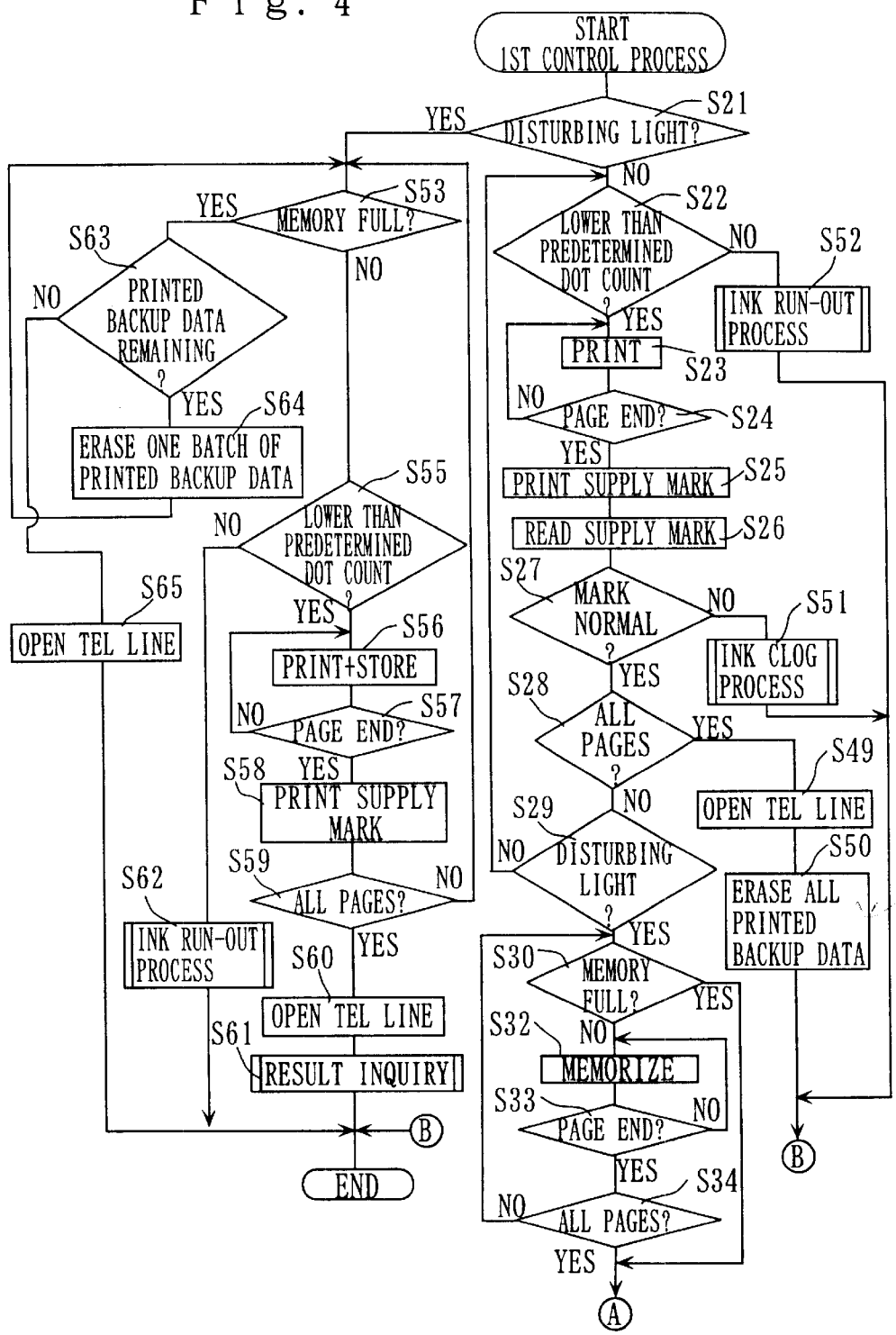
FIGS. 4 and 5 represent, in combination, a flow diagram illustrating a first control process of the same facsimile machine.
Figure 5:
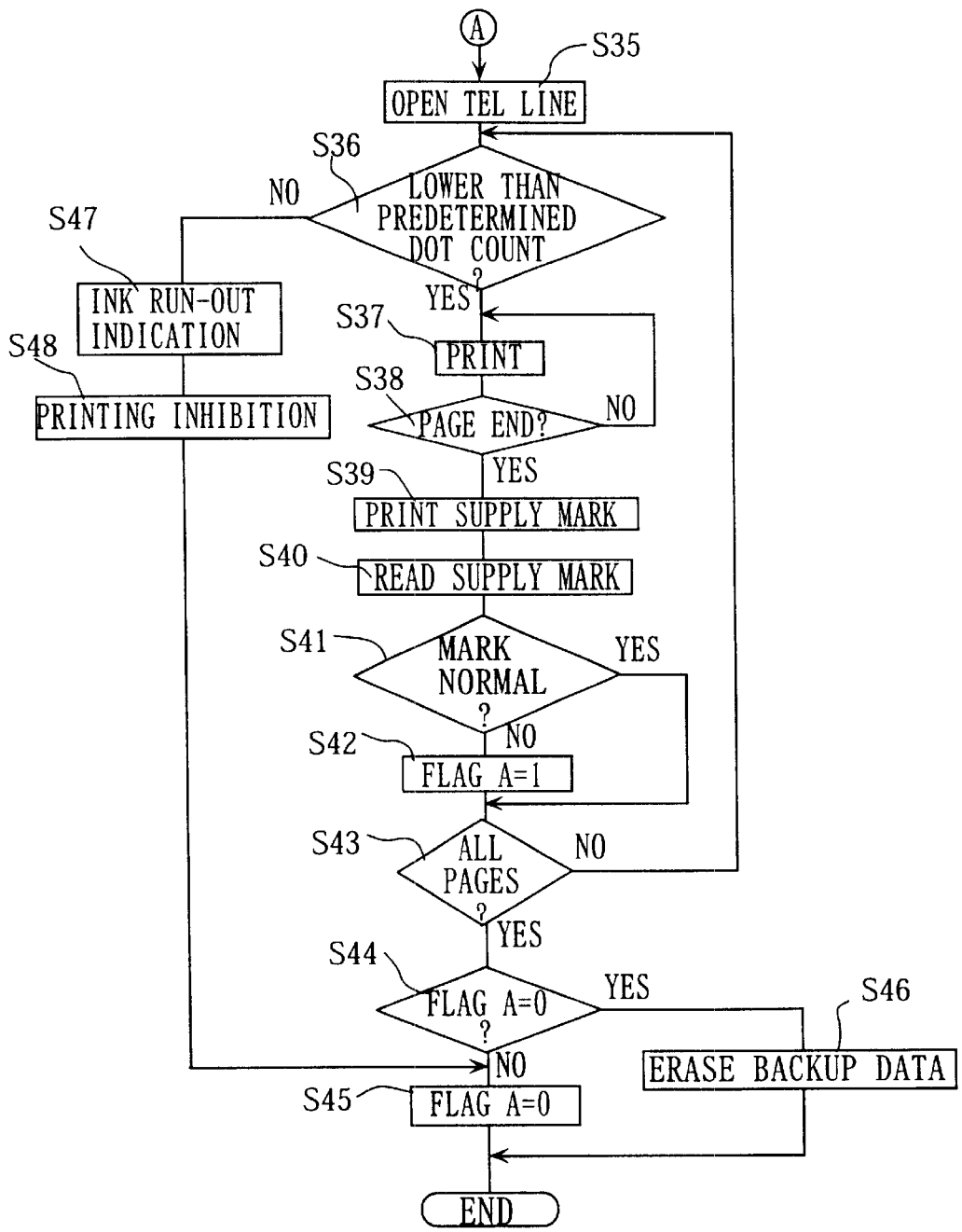

FIGS. 4 and 5 are flow diagrams illustrating the first control process in Step S6 in FIG. 3.

The first control process is started with Step S21 wherein the CPU 1 checks entry of disturbing light from outside. Specifically, the CPU 1 monitors the detection output from the mark sensor 15 to check if the output exceeds a predetermined value under the condition where no recording paper sheet is present at the detecting position of the mark sensor 15 and the light source (e.g. light emitting diode) of the mark sensor 15 is turned off.

If "No" in Step S21, the CPU 1 then determines whether the count of a dot counter is no higher than a predetermined value (Step S22). Specifically, the CPU 1 reads out the count of a black-ink dot counter from the EEPROM 6 and checks if the count is no higher than a second threshold which is set higher than a first threshold. The dot counter may be provided by the CPU 1 which monitors the printing data to be supplied to the printing section 1 for calculating the accumulated count of ink dots with respect to each color, and stores the accumulated count in the EEPROM 6. The dot counter is automatically reset for each color every time an ink cartridge is replaced. When the count of the dot counter exceeds the first threshold value, the CPU 1 causes the display section 14 to make a warning that the relevant ink (the black ink in the present embodiment) is running short. Moreover, when the count of the dot counter exceeds the second threshold, the CPU 1 causes the display section 14 to display another warning that the black ink has run out while inhibiting subsequent printing with the black ink.

If the count of the dot counter is no more than the predetermined value ("Yes" in Step S22), the CPU 1 causes the printing section 12 to print the fax-received data (Step S23). Specifically, the CPU 1 supplies the fax-received data demodulated by the modem 4 and decoded by the codec 8 to the printing section 12 through the gate array 7 for printing one band of the received image on the recording sheet RS with the black ink. One band represents the secondary scanning direction width of the image formed by one movement of the printhead 120 in the primary scanning direction.

Then, the CPU 1 determines whether the printing of one page data is completed (Step S24).

If "Yes" in Step S24, the CPU 1 controls the printing section 12 to print an ink supply mark M at the trailing edge of the recording sheet RS (Step S25).

Then, the CPU 1 causes the mark sensor 15 to read the ink supply mark M (Step S26). Specifically, when the ink supply mark M on the recording sheet RS reaches the detection position of the mark sensor 15, the CPU 1 checks the detection data input from the mark sensor 15 through the gate array 7.

Then, the CPU 1 determines whether the ink supply mark M is normal (Step S27). Specifically, the CPU 1 checks if the value of the input detection data read in Step S26 is less than a predetermined value.

If "Yes" in Step S27, the CPU 1 determines whether all pages of fax-received data have been printed (Step S28).

If "No" in Step S28 (i.e., if there are more pages of fax-received data), the CPU 1 checks whether there is disturbing light entry from outside (Step S29).

If "Yes" in Step S29, the CPU 1 checks whether the RAM 3 is full (Step S30). Specifically, the CPU 1 checks whether the non-occupied capacity of the RAM 3 is no less than a predetermined amount.

If "No" in Step S30, the CPU 1 stores the fax-received data in the RAM 3 as backup data (Step S32). Specifically, the CPU 1 causes the DMAC 9 to store predetermined bytes of fax-received data in the RAM 3 each time. In other words, upon entry of disturbing light during fax reception, the CPU 1 stops printing out the fax-received data on the relevant page and shifts to memory reception. At this time, the RAM 3 also stores, together with the backup data, various secondary data which include fax reception time, fax sender, and information indicating that the fax-received data have not been already printed out. Further, after subsequently printing out the backup data, the "non-printed" indication in the RAM 3 is changed to a "printed" indication.

Then, the CPU 1 determines whether one page of fax-received data has been stored in the RAM 3 (Step S33).

If "Yes" in Step S33, the CPU 1 then determines whether all pages of fax-received data have been stored in the RAM 3 (Step S34).

If "Yes" in Step S34, the CPU 1 causes the NCU 2 to open the telephone line 21 (FIG. 5; Step S35).

Then, in Step S36, the CPU 1 determines whether the count of the dot counter is no higher than the predetermined value (i.e., the second threshold as previously defined).

If the count of the dot counter is no more than the second threshold ("Yes" in Step S36), the CPU 1 causes the printing section 12 to print out the backup data (Step S37). Specifically, the CPU 1 reads out the backup data from the RAM 3 (previously stored in Step S32) and supplies them to the printing section 12 through the gate array 7 for printing one band of the backup data on the recording sheet RS with the black ink.

Then, the CPU 1 determines whether the printing of one page data is completed (Step S38).

If "Yes" in Step S38, the CPU 1 controls the printing section 12 to print an ink supply mark M at the trailing edge of the recording sheet RS (Step S39).

Then, the CPU 1 causes the mark sensor 15 to read the ink supply mark M (Step S40).

Then, the CPU 1 determines whether the ink supply mark M is normal (Step S41).

If "No" in Step S41, the CPU 1 sets a flag A to "1" (Step S42). Specifically, the CPU 1 reads out the flag A from a predetermined region of the EEPROM 6 and rewrite the value "0" to "1" if it is currently "0" while maintaining the same value if it is currently "1". The flag A indicates whether the ink supply mark M read during the printing of the backup data is normal or not. The value "1" of the flag A represents that the ink supply mark M is not normal, whereas the value "0" of the flag A means that the ink supply mark M is normal.

Then, the CPU 1 determines whether all pages of backup data have been printed (Step S43).

If "Yes" in Step S43, the CPU 1 determines whether the flag A is currently "0" (Step S44). If "No" in Step S44, it is suspected that the backup data may not have been normally printed. Therefore, the CPU 1 rewrites the flag A to "0" (Step S45) and terminates the first control process routine without erasing the backup data in the RAM 3.

In Step S44, if the flag A is "0" ("Yes" in Step S44), it estimated that all pages of backup data have been normally printed because the ink supply mark M for every page has been normally read. Therefore, the CPU 1 erases the backup data currently stored in the RAM 3 (Step S46) and terminates the first control process routine.

In Step S43, if all pages of backup data have not been printed out ("No" in Step S43), Step S36 follows to prepare for printing a new page of backup data.

In Step S41, if the ink supply mark M has been normally read ("Yes" in Step S41), the process proceeds to Step S43 by skipping Step S42 because it is unnecessary to set the flag A to "1".

In Step S38, if the printing of one page of backup data has not finished yet ("No" in Step S38), the printing of the same page is continued by returning to Step S37.

In Step S36, if the count of the dot counter is more than the second threshold ("No" in Step S36), the CPU 1 causes the display section 14 to make an ink run-out indication (Step S47).

Step S47 is followed by Step S48 wherein the CPU 1 sets a printing inhibition mode before proceeding to Step S45. When the printing inhibition mode is set, memory reception (i.e., reception of the fax data by the RAM 3) prevails over real-time printing, and the CPU 1 refuses fax reception unless the usable capacity of the RAM 3 exceeds a predetermined amount. The printing inhibition mode is canceled when the black ink flow path is automatically cleaned by the cleaner CL (FIG. 2) after ink cartridge replacement.

In Step S34 (see FIG. 4), unless all pages of fax-received data have been stored in the RAM 3 ("No" in Step S34), Step S30 follows to prepare for storing a new page of fax-received data.

In Step S33, unless one page of fax-received data have been stored in the RAM 3 ("No" in Step S33), the data storage for the same page is continued by returning to Step S32.

In Step S30, if the RAM 3 is found full ("Yes" in Step S30), the first control process proceeds to Step S35 (see FIG. 5) by skipping Steps S32–S34 because no memory region is available for data backup.

In Step S29, if there is disturbing light ("No" in Step S29), Step S22 follows to prepare for subsequent printing.

In Step S28, if the printing of the fax-received data is completed over all pages ("Yes" in Step S28), the CPU 1 opens the telephone line 21 (Step S49).

Then, the CPU 1 wholly erases those of the stored backup data (Step S50) which have been already printed out, and terminates the first control process routine. Specifically, the CPU 1 reads the secondary data attendant with each set of backup data from the RAM 3, determines whether the set of backup data is already printed or not, and erases the printed set of backup data from the RAM 3.

In Step S27, if the ink supply mark M is not normally read despite the absence of disturbing light entry ("No" in Step S27), an ink clog must have occurred. Therefore, the CPU 1 executes an ink clog process (Step S51) and terminates the first control process routine. The details of the ink clog process will be described hereinafter.

In Step S24, if the printing of one page of fax-received data has not finished yet ("No" in Step S24), the printing of the same page is continued by returning to Step S23.

In Step S22, if the count of the dot counter is more than the second threshold ("No" in Step S22), the CPU 1 performs an ink run-out process (Step S52) because the black ink must have run out, and terminates the first control process routine. The details of the ink run-out process will described hereinafter.

In Step S21, if there is disturbing light ("Yes" in Step S21), the CPU 1 determines whether the RAM 3 is full (Step S53).

If "No" in Step S53, the CPU 1 determines whether the count of the dot counter is no higher than the second threshold (Step S55).

If "Yes" in Step S55, the CPU 1 causes the printing section 12 to print out the fax-received data while also storing the same data in the RAM (Step S56). Specifically, the CPU 1 supplies the fax-received data (as demodulated by the modem 4 and as decoded by the codec 8) to the printing section 12 through the gate array 7 for printing on the recording sheet RS with the black ink while also causing the DMAC 9 to store predetermined bytes of fax-received data in the RAM 3 each time.

Then, the CPU 1 determines whether the printing and storing of one page data is completed (Step S57).

If "Yes" in Step S57, the CPU 1 controls the printing section 12 to print an ink supply mark M at the trailing edge of the recording sheet RS (Step S58).

Then, the CPU 1 determines whether all pages of fax-received data have been printed and stored (Step S59).

If "Yes" in Step S59, the CPU 1 opens the telephone line 21 (Step S60).

Then, the CPU 1 performs an inquiry process for inquiring about the printing results (Step S61) and terminates the first control process routine. The details of the result inquiry process will be described hereinafter.

In Step S59, if the printing and storing of the fax-received data has not been completed over all pages ("No" in Step S59), Step S53 follows to prepare for subsequently printing and storing a new page of fax-received data.

In Step S57, if the printing and storing of one page of fax-received data has not finished yet ("No" in Step S57), the printing and storing of the same page is continued by returning to Step S56.

In Step S55, if the count of the dot counter is more than the second threshold ("No" in Step S55), the CPU 1 performs an ink run-out process (Step S62) because the black ink must have run out, and terminates the first control process routine. The details of the ink run-out process will described hereinafter.

In Step S53, if the RAM 3 is full ("Yes" in Step S53), the CPU 1 determines whether there are any batches of printed backup data in the RAM 3 (Step S63).

If "Yes" in Step S63, one batch of printed backup data in the RAM 3 is erased in Step S64 which is followed by Step S53 in a loop.

If "No" in Step S63, the CPU 1 controls the NCU 2 to open the telephone line 21 line (Step S65) and terminates the first control process routine.

In this way, when both of the mark flag and the backup flag are "On " in the absence of disturbing light, the printing section 12 prints out fax-received data in real time while also printing an ink supply mark M which is detected by the mark sensor 15. If the ink supply mark M can be normally read with respect to every page, it is estimated that no ink clog has occurred. Therefore, those of the backup data in the RAM 3, if already printed out, are entirely erased.

If the ink supply mark cannot be normally read even though there is no disturbing light, it is considered that an ink clog has occurred, so that memory reception of the fax data ensues.

If disturbing light enters in the course of real-time printing, memory reception of the fax data takes the place of the real-time printing, and the memory backup data are automatically printed out immediately upon completion of the memory reception. Such a control is adopted because disturbing light incoming in the course of real-time printing is considered temporary and will be no longer present when the memory reception finishes.

If disturbing light is present at the very start of fax reception, memory backup of the fax-received data starts with the first page while simultaneously performing real-time printing. This is because an ink supply mark M may not be normally read in the presence of disturbing light.

Figure 6:
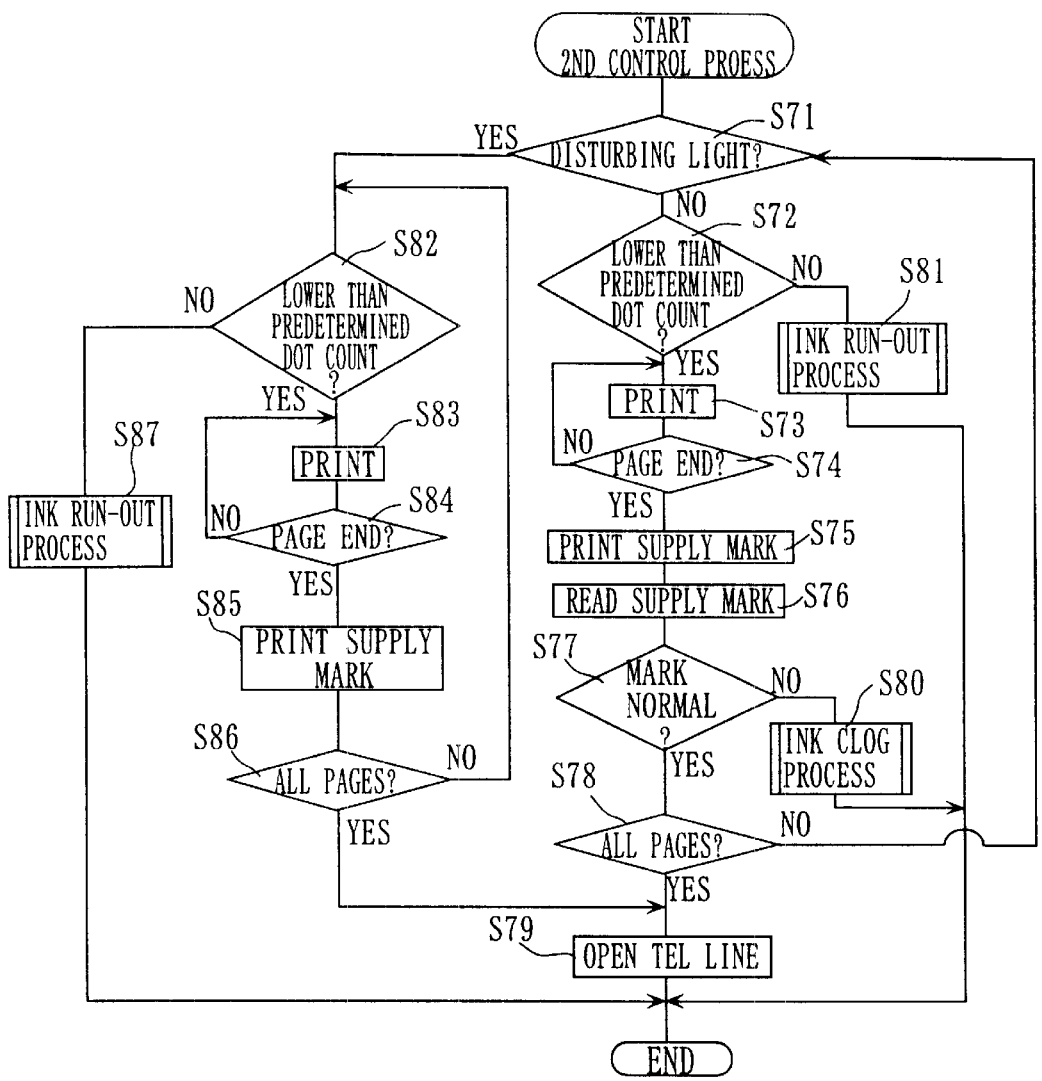
FIG. 6 is a flow diagram illustrating a second control process of the same facsimile machine.

FIG. 6 is a flow diagram illustrating the second control process (Step S7 in FIG. 3) which is adopted when the mark flag is "On" with the backup flag shifted to "Off".

The second control process starts with Step S71 wherein the CPU 1 checks the presence of disturbing light from outside.

If "No" in Step S71, the CPU 1 then determines whether the count of the dot counter is no higher than the second threshold (Step S72).

If the count of the dot counter is no more than the predetermined value ("Yes" in Step S72), the CPU 1 causes the printing section 12 to print the fax-received data (Step S73).

Then, the CPU 1 determines whether the printing of one page data is completed (Step S74).

If "Yes" inStep S74, the CPU 1 controls the printing section 12 to print an ink supply mark M at the trailing edge of the recording sheet RS (Step S75).

Then, the CPU 1 causes the mark sensor 15 to read the ink supply mark M (Step S76).

Then, the CPU 1 determines whether the ink supply mark M is normal (Step S77).

If "Yes" in Step S77, the CPU 1 determines whether all pages of fax-received data have been printed (Step S78).

If "Yes" in Step S78, the CPU 1 causes the NCU 2 to open the telephone line 21 (Step S79) and terminates the second control process routine.

In Step S78, if all pages of fax-received data have not been printed yet ("No" in Step S78), Step S71 follows in a loop to prepare for printing a new page of fax-received data.

In Step S77, if the ink supply mark M is not normally read despite the absence of disturbing light entry ("No" in Step S77), an ink clog must have occurred. Therefore, the CPU 1 executes an ink clog process (Step S80) and terminates the second control process routine. The details of the ink clog process will be described hereinafter.

In Step S74, if the printing of one page of fax-received data has not finished yet ("No" in Step S74), the printing of the same page is continued by returning to Step S73.

In Step S72, if the count of the dot counter is more than the second threshold ("No" in Step S72), the CPU 1 performs an ink run-out process (Step S81), and terminates the second control process routine. The details of the ink run-out process will described hereinafter.

In Step S71, if there is disturbing light ("Yes" in Step S71), the CPU 1 determines whether the count of the dot counter is no higher than the second threshold (Step S82).

If "Yes" in Step S82, the CPU 1 causes the printing section 12 to print out the fax-received data (Step S83).

Then, the CPU 1 determines whether the printing of one page data is completed (Step S84).

If "Yes" in Step S84, the CPU 1 controls the printing section 12 to print an ink supply mark M at the trailing edge of the recording sheet RS (Step S85).

Then, the CPU 1 determines whether all pages of fax-received data have been printed (Step S86).

If "Yes" in Step S86, the CPU 1 opens the telephone line 21 (Step S79) and terminates the second control process routine.

In Step S86, if the printing of the fax-received data has not been completed over all pages ("No" in Step S86), Step S82 follows to prepare for subsequently printing a new page of fax-received data.

In Step S84, if the printing of one page of fax-received data has not finished yet ("No" in Step S84), the printing of the same page is continued by returning to Step S83.

In Step S82, if the count of the dot counter is more than the second threshold ("No" in Step S82), the CPU 1 performs an ink run-out process (Step S87) and terminates the second control process routine. The details of the ink run-out process will described hereinafter.

In this way, when the mark flag is "On" with the backup flag shifted to "Off", the CPU 1 causes the printing section 12 to print out fax-received data without causing the RAM 3 to store the same data for backup regardless of the presence or absence of disturbing light. Such a control takes account of the intention of the user who has chosen not to keep the fax-received data as memory backup data. It is only in the ink run-out process or the ink clog process (to be described later) that the RAM 3 stores fax-received data for backup.

Figure 7:
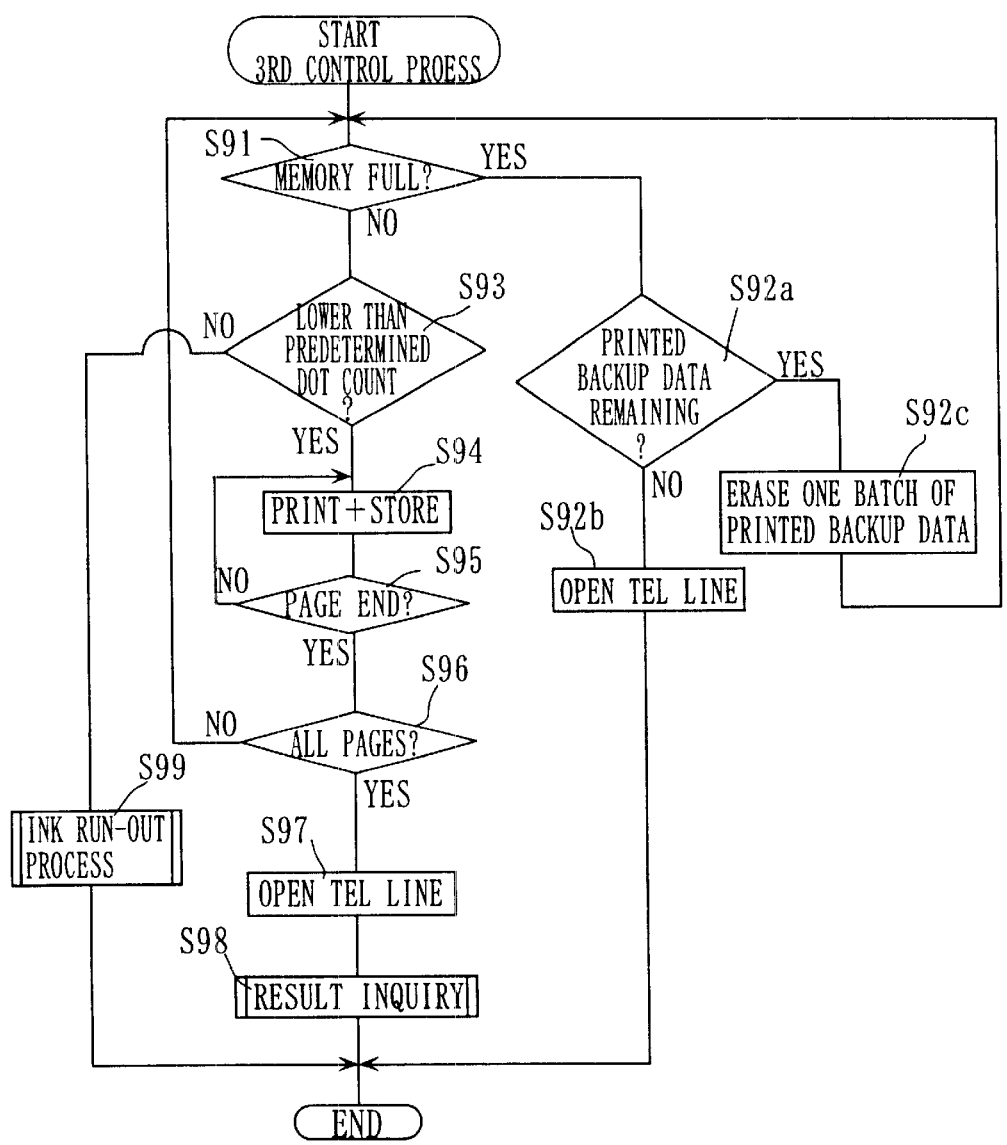
FIG. 7 is a flow diagram illustrating a third control process of the same facsimile machine.

FIG. 7 is a flow diagram illustrating the third control process (Step S9 in FIG. 3) which is performed when the mark flag is "Off" with the backup flag held "On".

The third control process starts with Step S91 wherein the CPU 1 determines whether the RAM 3 is full.

If "No" in Step S91, the CPU I determines whether the count of the dot counter is no higher than the second threshold (Step S93).

If "Yes" in Step S93, the CPU 1 causes the printing section 12 to print out the fax-received data while also storing the same data in the RAM (Step S94).

Then, the CPU 1 determines whether the printing and storing of one page data is completed (Step S95).

If "Yes" in Step S95, the CPU 1 determines whether all pages of fax-received data have been printed and stored (Step S96).

If "Yes" in Step S96, the CPU 1 opens the telephone line 21 (Step S97).

Then, the CPU 1 performs an inquiry process for inquiring about the printing results (Step S98) and terminates the third control process routine. The details of the result inquiry process will be described hereinafter.

In Step S96, if the printing and storing of the fax-received data has not been completed over all pages ("No" in Step S96), Step S91 follows to prepare for subsequently printing and storing a new page of fax-received data.

In Step S95, if the printing and storing of one page of fax-received data has not finished yet ("No" in Step S95), the printing and storing of the same page is continued by returning to Step S94.

In Step S93, if the count of the dot counter is more than the second threshold ("No" in Step S93), the CPU 1 performs an ink run-out process (Step S62) and terminates the third control process routine. The details of the ink run-out process will described hereinafter.

In Step S91, if the RAM 3 is full ("Yes" in Step S91), the CPU 1 determines whether there are any batches of printed backup data in the RAM 3 (Step S92a).

If "No" in Step S92a, the CPU 1 controls the NCU 2 to open the telephone line 21 line (Step S92b) and terminates the third control process routine.

If "Yes" in Step S92a, one batch of printed backup data in the RAM 3 is erased in Step S92c which is followed by Step S91 in a loop.

In this way, when the mark flag is "Off" with the backup flag held "On",the CPU 1 causes the RAM 3 to store all fax-received data for backup regardless of the presence or absence of disturbing light. Further, the printing section 12 does not print any ink supply mark on any recording paper sheet.

Figure 8:
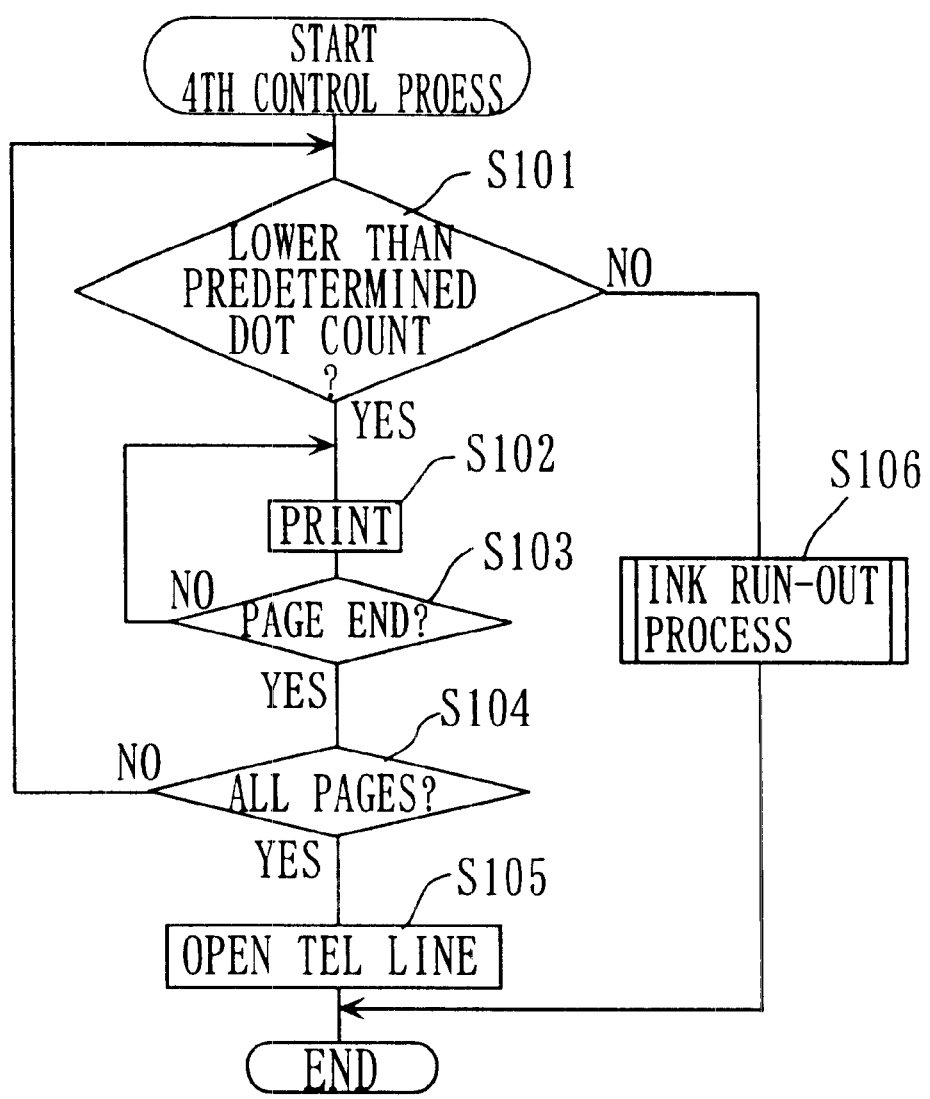
FIG. 8 is a flow diagram illustrating a fourth control process of the same facsimile machine.

FIG. 8 is a flow diagram illustrating the fourth control process (Step S10 in FIG. 3) which is performed when both of the mark flag and the backup flag are "Off".

The fourth control process starts with Step S101 wherein the CPU 1 determines whether the count of the dot counter is no higher than the second threshold.

If "Yes" in Step S101, the CPU 1 causes the printing section 12 to print out the fax-received data (Step S102).

Then, the CPU 1 determines whether the printing of one page data is completed (Step S103).

If "Yes" in Step S103, the CPU 1 determines whether all pages of fax-received data have been printed (Step S104).

If "Yes" in Step S104, the CPU 1 opens the telephone line 21 (Step S105) and terminates the fourth control process routine.

In Step S104, if the printing of the fax-received data has not been completed over all pages ("No" in Step S104), Step S101 follows to prepare for subsequently printing a new page of fax-received data.

In Step S103, if the printing of one page of fax-received data has not finished yet ("No" in Step S103), the printing of the same page is continued by returning to Step S102.

In Step S101, if the count of the dot counter is more than the second threshold ("No" in Step S101), the CPU 1 performs an ink run-out process (Step S106) and terminates the fourth control process routine. The details of the ink run-out rocess will described hereinafter.

In this way, when both of the mark flag and the backup flag are "Off", no printing of an ink supply mark and no data backup take place regardless of the presence or absence of disturbing light.

Figure 9:
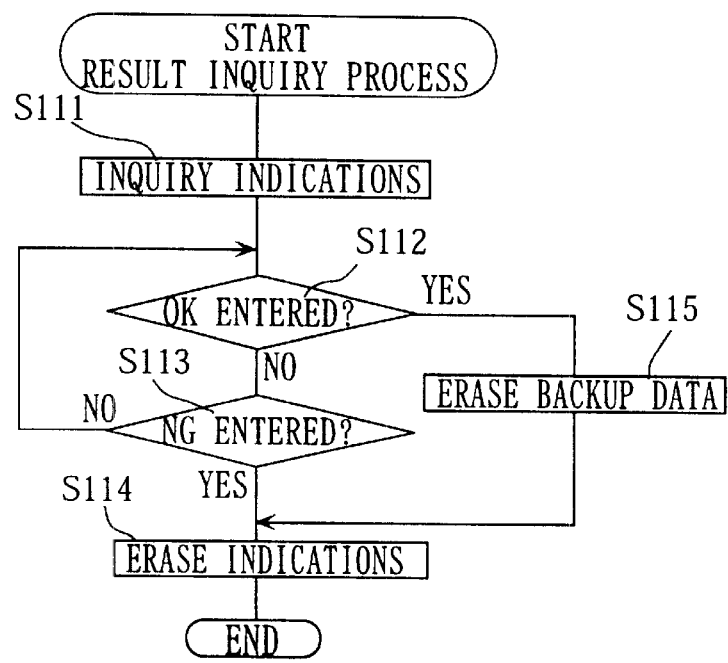
FIG. 9 is a flow diagram illustrating a print result inquiry process of the same facsimile machine.

FIG. 9 is a flow diagram illustrating the result inquiry process (Step S61 in FIG. 4; Step S98 in FIG. 7).

The result inquiry process begins with Step Sill wherein the CPU 1 causes the display section 14 to display inquiries to the user about the print results. Specifically, the CPU 1 causes the display section 14 to alternately display two different inquiry indications at a predetermined interval, as shown in FIGS. 10A and 10B.

Then, the CPU 1 determines whether the user has entered a print-OK signal (Step S112). Specifically, the CPU 1 checks whether the user has pressed the No.1 key of the numeral keys at the operation section 13.

If "No" in Step S112, the CPU 1 determines whether the user has entered a print-NG signal (NG: No Good) (S113). Specifically, the CPU 1 checks whether the user has pressed the No.2 key of the numeral keys at the operation section 13.

If "Yes" in Step S113, the CPU 1 causes the display section 14 to delete the inquiry indications (Step S114) and terminates the result inquiry process routine.

If "No" in Step S113, Step S112 follows in a loop to wait for a user's input operation.

In Step S112, if the user makes a print-OK input ("Yes" in Step S112), the CPU 1 erases the relevant backup data (Step S115) and proceeds to Step S114. Specifically, the CPU 1 erases the fax-received data stored in the RAM 3 in Step S56 (FIG. 4) or Step S94 (FIG. 7).

In this way, when printing and storing are simultaneously performed, inquiry is made to the user as to the print results. If the print results are acceptable, the relevant batch of backup data is erased so that unnecessary backup data will not remain in the RAM 3.

Figure 11:
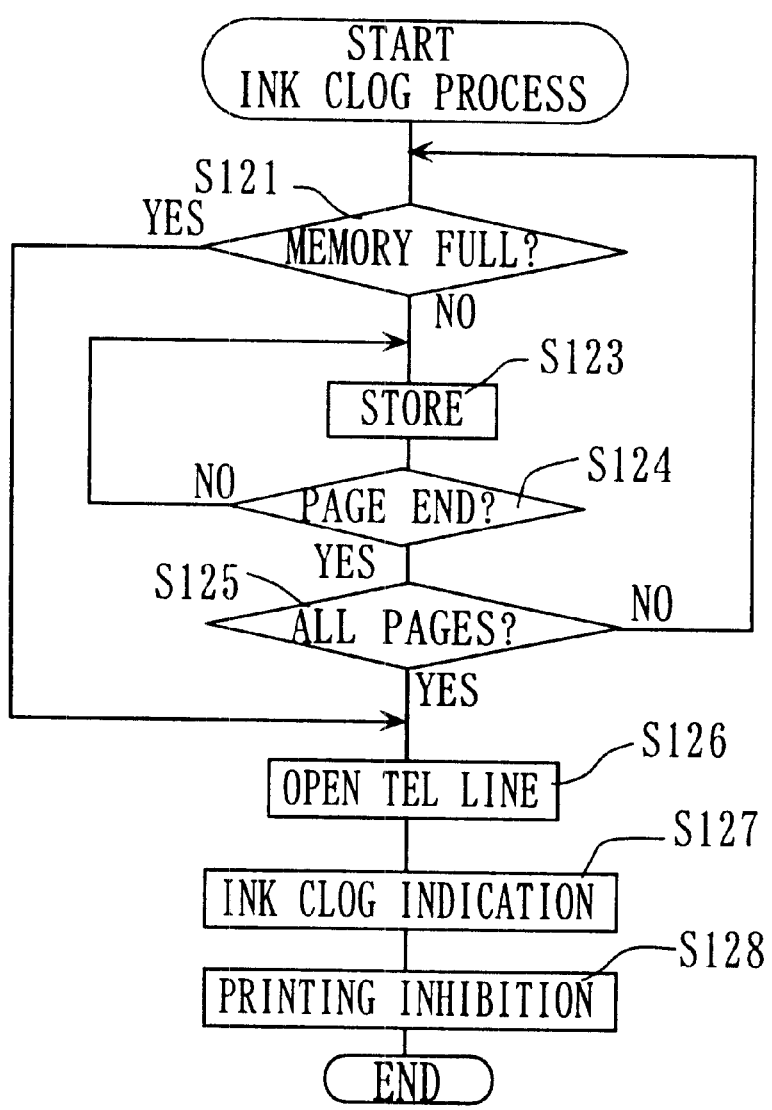
FIG. 11 is a flow diagram illustrating an ink clog process of the same facsimile machine.

FIG. 11 is a flow diagram illustrating the ink clog process in Step S51 in FIG. 4 or Step S80 in FIG. 6.

The ink clog process starts with Step S121 wherein the CPU 1 checks whether the RAM 3 is full.

If "No" in Step S121, the CPU 1 stores the fax-received data in the RAM 3 as backup data (Step S123). Specifically, the CPU 1 first transfers, from the buffer region of the RAM 3 to the backup region of the same, a batch of fax-received data corresponding to the page whose ink supply mark has not been properly read by the mark sensor 15, and then causes the DMAC 9 to store subsequent batches of fax-received data (corresponding to the subsequent pages) in the RAM 3. Even the printed batch of fax-received is stored in the RAM 3 for backup because a failure to normally read the ink supply mark of a particular page represents the likelihood that an ink clog should have occurred in the course of printing that page.

Then, the CPU 1 determines whether one page of fax-received data has been stored in the RAM 3 (Step S124).

If "Yes" in Step S124, the CPU 1 then determines whether all pages of fax-received data have been stored in the RAM 3 (Step S125).

If "Yes" in Step S125, the CPU 1 causes the NCU 2 to open the telephone line 21 (Step S126).

Then, the CPU 1 controls the display section 14 to make an ink clog indication (Step S127).

Then, the CPU 1 sets a printing inhibition mode (Step S128) and terminates the ink clog process routine. Once the printing inhibition mode is set, memory fax reception prevails, and the CPU 1 refuses fax reception unless the usable capacity of the RAM 3 exceeds a predetermined amount. The printing inhibition mode is canceled only after the cleaning of the black ink flow path which is performed in response to the user's pressing of a predetermined key at the operation section 13 or automatically at a predetermined time interval while the facsimile machine is turned on.

In Step S125, unless all pages of fax-received data have been stored in the RAM 3 ("No" in Step S125), Step S121 follows in a loop to prepare for storing a new page of fax-received data.

In Step S124, unless one page of fax-received data have been stored in the RAM 3 ("No" in Step S124), the data storage for the same page is continued by returning to Step S123.

In Step S121, if the RAM 3 is found full ("Yes" in Step S121), the ink clog process proceeds to Step S126 by skipping Steps S123–S125 because no memory region is available for data backup.

In this way, when an ink supply mark cannot be normally read, it is presumed that the black ink flow path has been clogged, so that an ink clog indication is displayed so as to prompt the user for cleaning the black ink flow path.

Figure 12:
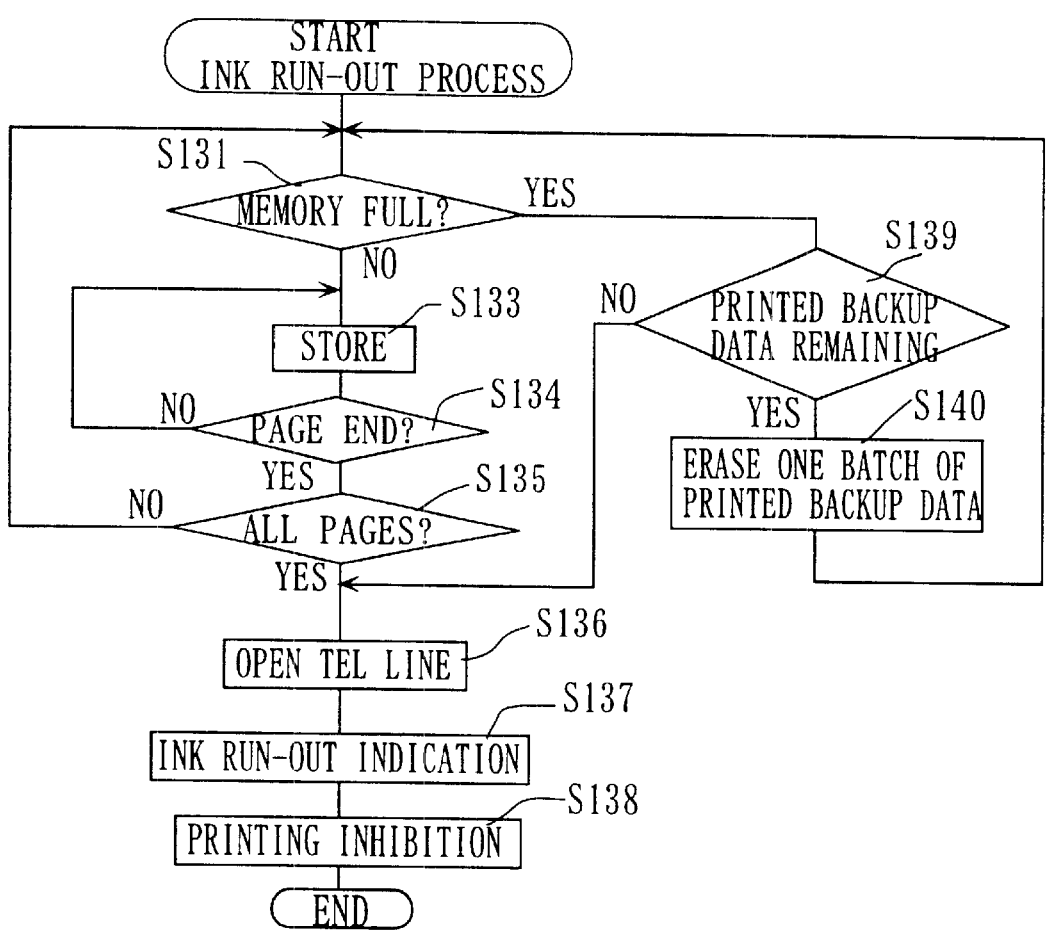
FIG. 12 is a flow diagram illustrating an ink run-out process of the same facsimile machine.

FIG. 12 is a flow diagram illustrating the ink run-out process (Step S52 in FIG. 4; Steps S81 and S87 in FIG. 6; Step S99 in FIG. 7; Step 106 in FIG. 8).

The ink run-out process starts with Step S131 wherein the CPU 1 checks whether the RAM 3 is full.

If "No" in Step S131, the CPU 1 stores the fax-received data in the RAM 3 as backup data (Step S133). Specifically, the CPU 1 causes the DMAC 9 to store predetermined bytes of fax-received data in the RAM 3 each time. At this time, since the second threshold of the dot counter is set slightly lower than an actual ink run-out value for enabling the completion of printing the relevant page, backup of the fax-received data by the RAM 3 starts with the next page.

Then, the CPU 1 determines whether one page of fax-received data has been stored in the RAM 3 (Step S134).

If "Yes" in Step S134, the CPU 1 then determines whether all pages of fax-received data have been stored in the RAM 3 (Step S135).

If "Yes" in Step S135, the CPU 1 causes the NCU 2 to open the telephone line 21 (Step S136).

Then, the CPU 1 controls the display section 14 to make an ink run-out indication (Step S137).

Then, the CPU 1 sets a printing inhibition mode (Step S138) and terminates the ink run-out process routine. Once the printing inhibition mode is set, memory fax reception prevails, and the CPU 1 refuses fax reception unless the usable capacity of the RAM 3 exceeds a predetermined amount. The printing inhibition mode is canceled only after the cleaning of the black ink flow path which is performed after replacement of a black ink cartridge.

In Step S135, unless all pages of fax-received data have been stored in the RAM 3 ("No" in Step S135), Step S131 follows in a loop to prepare for storing a new page of fax-received data.

In Step S134, unless one page of fax-received data have been stored in the RAM 3 ("No" in Step S134), the data storage for the same page is continued by returning to Step S133.

In Step S131, if the RAM 3 is found full ("Yes" in Step S131), the CPU 1 determines whether there are any batches of printed backup data in the RAM 3 (Step S139).

If "Yes" in Step S139, one batch of printed backup data in the RAM 3 is erased in Step S140 which is followed by Step S131 in a loop.

If "No" in Step S139, the ink run-out process proceeds to Step S136 which is previously described.

In this way, when the count of the black ink dot counter exceeds the second threshold, the CPU 1 detects an ink run-out and prompts the user to replace the black in cartridge.

Figure 13:
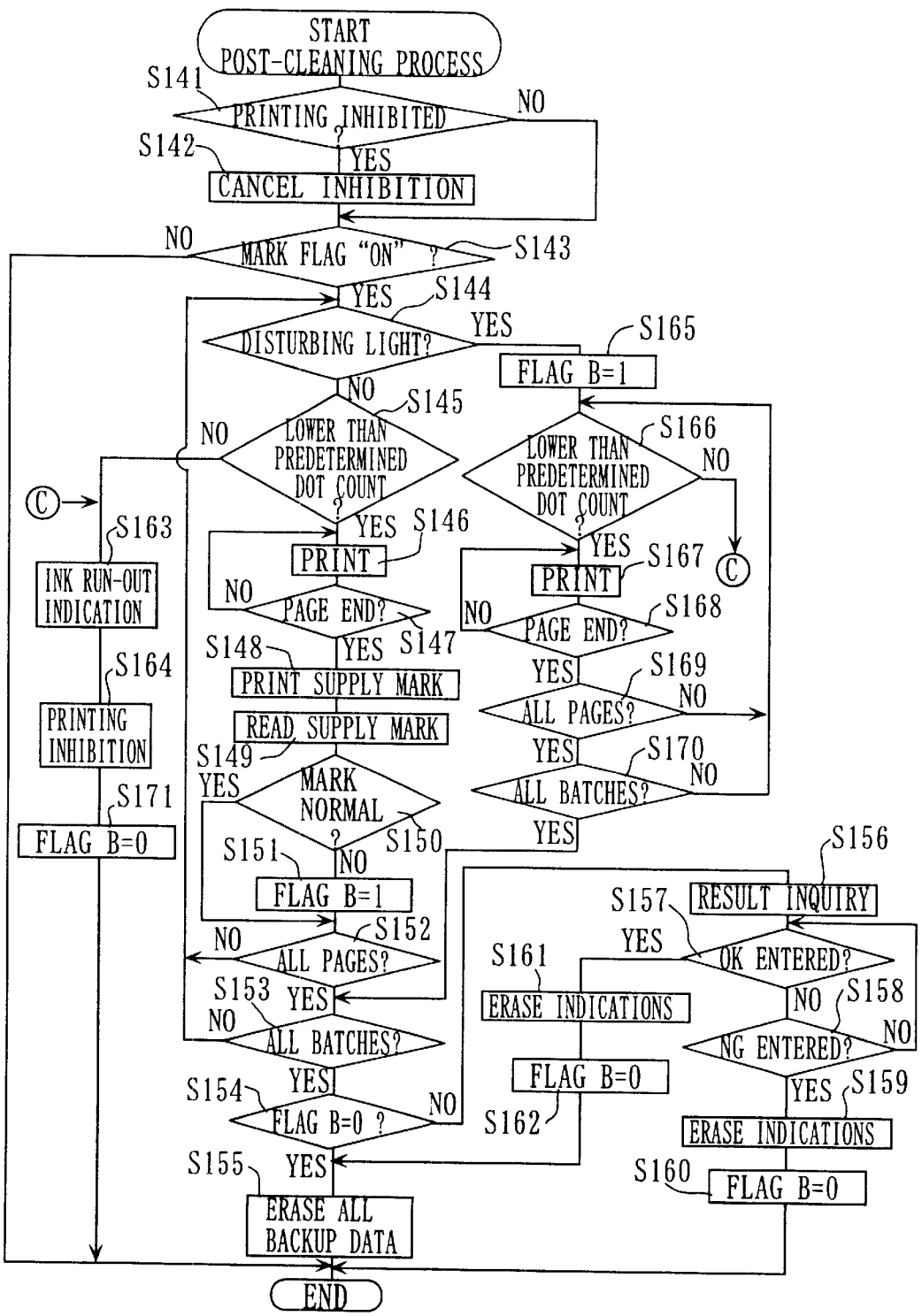
FIG. 13 is a flow diagram illustrating a post-cleaning process of the same facsimile machine.

FIG. 13 is a flow diagram a post-cleaning process which is automatically performed after the cleaning of the black ink flow path in response to the user's pressing of a predetermined key at the operation section 13, or at a predetermined time interval while the facsimile machine is turned on, or after replacement of a black ink cartridge.

The post-cleaning process begins with Step S141 wherein the CPU 1 checks whether a printing inhibition mode is set.

If "Yes" in Step S141, the CPU 1 cancels the printing inhibition mode (S142).

Then, the CPU 1 determines whether the mark flag is "On" (Step 143). Specifically, the CPU 1 reads out the mark flag from the EEPROM 6 to check whether it is currently "1".

If "Yes" in Step S143, the CPU 1 checks entry of disturbing light from outside (Step S144). Specifically, the CPU 1 monitors the detection output from the mark sensor 15 to check if the output exceeds a predetermined value under the condition where no recording paper sheet is present at the detecting position of the mark sensor 15 and the light source (e.g. light emitting diode) of the mark sensor 15 is turned off.

If "No" in Step S144, the CPU 1 then determines whether the count of the dot counter is no higher than the second threshold (Step S145).

If "Yes" in Step S145, the CPU 1 reads out the backup data from the RAM 3 and supplies them to the printing section 12 through the gate array 7 for printing out (Step S146).

Then, the CPU 1 determines whether the printing of one page data is completed (Step S147).

If "Yes" in Step S147, the CPU 1 controls the printing section 12 to print an ink supply mark M at the trailing edge of the recording sheet RS (Step S148).

Then, the CPU 1 causes the mark sensor 15 to read the ink supply mark M (Step S149).

Then, the CPU 1 determines whether the ink supply mark M has been normally read by the mark sensor 15 (Step S150).

If "No" in Step S150, the CPU 1 sets a flag B to "1" (Step S151). Specifically, the CPU 1 reads out the flag B from a predetermined region of the EEPROM 6 and rewrite the value "0" to "1" if it is currently "0" while maintaining the same value if it is currently "1". The flag B indicates whether the ink supply mark M read during the printing of the backup data is normal or not. The value "1" of the flag B represents that the ink supply mark M is not normal, whereas the value "0" of the flag B means that the ink supply mark M is normal.

Then, the CPU 1 determines whether all pages of backup data for one batch or case have been printed (Step S152).

If "Yes" in Step S152, the CPU 1 checks whether all batches or cases of backup data have been printed (Step S153).

If "Yes" in Step S153, the CPU 1 determines whether the flag B is currently "0" (Step S154).

If "Yes" in Step S154, it estimated that all batches of backup data have been normally printed because the ink supply mark M for every page has been normally read with respect to every batch of the backup data. Therefore, the CPU 1 erases all of the backup data currently stored in the RAM 3 (Step S155) and terminates the post-cleaning process routine.

If "No" in Step S155, on the other hand, it is suspected hat the backup data may not have been normally printed. Therefore, the CPU 1 causes the display section 14 to display inquiries to the user about the print results (Step S156). Specifically, the CPU 1 causes the display section 14 to alternately display the two different inquiry indications (see FIGS. 10A and 10B) at a predetermined interval, similarly to the result inquiry process illustrated in FIG. 9.

Then, the CPU 1 determines whether the user has entered a print-OK signal (Step S157). Specifically, the CPU 1 checks whether the user has pressed the No.1 key of the numeral keys at the operation section 13.

If "No" in Step S157, the CPU 1 determines whether the user has entered a print-NG signal (Step S158). Specifically, the CPU 1 checks whether the user has pressed the No.2 key of the numeral keys at the operation section 13.

If "Yes" in Step S158, the CPU 1 causes the display section 14 to delete the inquiry indications (Step S114).

Then, the CPU 1 sets the flag B to "Off" and terminates the post-cleaning process routine.

If "No" in Step S158, Step S157 follows in a loop to wait for a user's input operation. In Step S157, if the user makes a print-OK input ("Yes" in Step S157), the CPU 1 controls the display section 14 to delete the inquiry indications (Step S161) and then sets the flag B to "Off" before proceeding to Step S155.

In Step S153, if all batches or cases of backup data have not been printed out ("No" in Step S153), Step S144 follows in a loop to prepare for printing the next batch of backup data.

In Step S152, if all pages of backup data have not been printed out ("No" in Step S152), Step S144 follows again to prepare for printing a new page of backup data.

In Step S150, if the ink supply mark M has been normally read ("Yes" in Step S150), the process proceeds to Step S152 by skipping Step S151 because it is unnecessary to set the flag B to "1".

In Step S147, if the printing of one page of backup data has not finished yet ("No" in Step S147), the printing of the same page is continued by returning to Step S146.

In Step S145, if the count of the dot counter is more than the second threshold ("No" in Step S145), the CPU 1 causes the display section 14 to make an ink run-out indication (Step S163).

Step S163 is followed by Step S164 wherein the CPU 1 sets a printing inhibition mode.

Then, the CPU 1 sets the flag B to "0" (Step S151) and terminates the post-cleaning process routine. Specifically, the CPU 1 reads out the flag B from the EEPROM 6 and rewrite the value "1" to "0" if it is currently "1" while maintaining the same value if it is currently "0".

In Step S144, if there is disturbing light ("Yes" in Step S144), the CPU 1 set the flag B to "1" (Step S165).

Then, the CPU 1 determines whether the count of the dot counter is no higher than the second threshold (Step S166).

If "Yes" in Step S166, the CPU 1 reads out the backup data from the RAM 3 and supplies them to the printing section 12 through the gate array 7 for printing out (Step S167).

Then, the CPU 1 determines whether the printing of one page data is completed (Step S168).

If "Yes" in Step S168, the CPU 1 determines whether all pages of backup data for one batch or case have been printed (Step S169).

If "Yes" in Step S169, the CPU 1 checks whether all batches or cases of backup data have been printed (Step S170).

If "Yes" in Step S170, the post-cleaning process proceeds to Step S153 to prepare for subsequent erasion of the backup data.

In Step S170, if all batches or cases of backup data have not been printed out ("No" in Step S170), Step S166 follows in a loop to prepare for printing the next batch of backup data.

In Step S169, if all pages of backup data have not been printed out ("No" in Step S169), Step S166 follows again to prepare for printing a new page of backup data.

In Step S168, if the printing of one page of backup data has not finished yet ("No" in Step S168), the printing of the same page is continued by returning to Step S167.

In Step S166, if the count of the dot counter is more than the second threshold ("No" in Step S166), the post-cleaning process proceeds to Step S163.

In Step S143, if the mark flag is not "On" ("No" in Step S143), the CPU 1 terminates the post-cleaning process routine because it is impossible to check whether the printing is proper even if the backup data are automatically printed out.

In Step S141, if the printing inhibition mode is not set ("No" in Step S141), the post-cleaning process proceeds to Step S143 by skipping Step S142 because there is no need to cancel the printing inhibition mode.

In this way, when the mark flag is "On",the backup data stored in the RAM 3 are automatically printed out after cleaning the black ink flow path. Further, if the ink supply mark is normally read with respect to all pages of all batches or cases, all of the backup data are automatically erased. However, if there is any ink supply mark which cannot be normally read, an inquiry is made to the user as to whether the backup data may be deleted.

Figure 14:
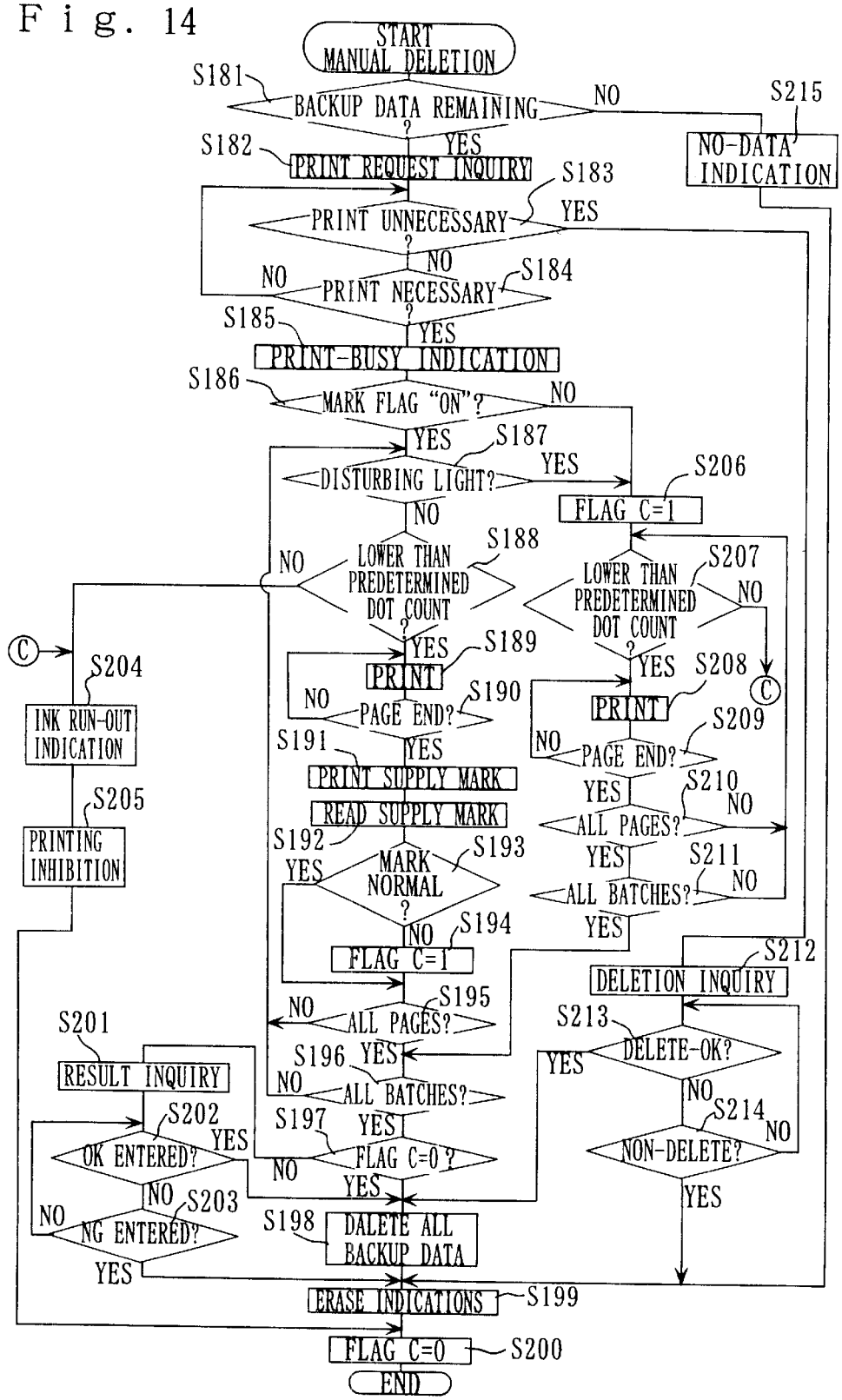
FIG. 14 is a flow diagram illustrating a manual data deletion process of the same facsimile machine.

FIG. 14 is a flow diagram illustrating a process for manual deletion or erasion of the backup data which is carried out in response to a predetermined key operation by the user. Such manual deletion of the backup data is necessary when successively performing full-color copying which requires a large region of the RAM 3. Further, the manual deletion process may also be utilized when the user wishes to print out the backup data on recording paper sheets.

The manual deletion process starts with Step S181 wherein the CPU 1 determines whether any backup data remain in the RAM 3. Examples of backup data here include all kinds of fax-received data stored in the RAM 3 for any reason (not only at the time of an ink clog or an ink run-out, but also at the time of a paper jam, a paper run-out or a data transfer).

If "Yes" in Step S181, the CPU 1 causes the display section 14 to display inquiries to the user as to the need for printing out the remaining backup data (Step S182). Specifically, the CPU 1 causes the display section 14 to alternately display two different inquiry indications at a predetermined interval, as shown FIGS. 15A and 15B.

Then, the CPU 1 determines whether the user has entered a non-print signal (Step S183). Specifically, the CPU 1 checks whether the user has pressed the No.2 key of the numeral keys at the operation section 13.

If "No" in Step S183, the CPU 1 determines whether the user has requested a print-out of the remaining backup data (Step S184). Specifically, the CPU 1 checks whether the user has pressed the No.1 key of the numeral keys at the operation section 13.

At the time of carrying out Steps S183 and S184, the user may refer to a memory status list which may be printed out or displayed at the display section 14 in response to a predetermined key operation of the user at the operation section 13. The memory status list may contain various pieces of information (such as the sender's name, the sender's telephone number and the time of fax reception) which may be useful for the user in determining the need for printing out the backup data. Further, the user may also refer to an communication activity report (see FIG. 16) which may be printed out at any time by a predetermined key operation of the user or automatically at a predetermined time interval.

If "Yes" in Step S184, the CPU 1 causes the display section 14 to make a print-busy indication (Step S185), as shown in FIG. 17.

Then, the CPU 1 determines whether the mark flag is "On" (Step 186). Specifically, the CPU 1 reads out the mark flag from the EEPROM 6 to check whether it is currently "1".

If "Yes" in Step S186, the CPU 1 checks entry of disturbing light from outside (Step S187). Specifically, the CPU 1 monitors the detection output from the mark sensor 15 to check if the output exceeds a predetermined value under the condition where no recording paper sheet is present at the detecting position of the mark sensor 15 and the light source of the mark sensor 15 is turned off.

If "No" in Step S187, the CPU 1 then determines whether the count of the dot counter is no higher than the second threshold (Step S188).

If "Yes" in Step S188, the CPU 1 reads out the backup data from the RAM 3 and supplies them to the printing section 12 through the gate array 7 for printing out (Step S189).

Then, the CPU 1 determines whether the printing of one page data is completed (Step S190).

If "Yes" in Step S190, the CPU 1 controls the printing section 12 to print an ink supply mark M at the trailing edge of the recording sheet RS (Step S191).

Then, the CPU 1 causes the mark sensor 15 to read the ink supply mark M (Step S192).

Then, the CPU 1 determines whether the ink supply mark M has been normally read by the mark sensor 15 (Step S193).

If "No" in Step S193, the CPU 1 sets a flag C to "1" (Step S194). Specifically, the CPU 1 reads out the flag C from the EEPROM 6 and rewrite the value "0" to "1" if it is currently "0" while maintaining the same value if it is currently "1". The flag C indicates whether the ink supply mark M read during the printing of the backup data is normal or not. The value "1" of the flag C represents that the ink supply mark M is not normal, whereas the value "0" of the flag C means that the ink supply mark M is normal.

Then, the CPU 1 determines whether all pages of backup data for one batch or case have been printed (Step S195).

If "Yes" in Step S195, the CPU 1 checks whether all batches or cases of backup data have been printed (Step S196).

If "Yes" in Step S196, the CPU 1 determines whether the flag C is currently "0" (Step S197).

If "Yes" in Step S197, it estimated that all batches of backup data have been normally printed because the ink supply mark M for every page has been normally read with respect to every batch of the backup data. Therefore, the CPU 1 erases all of the backup data currently stored in the RAM 3 (Step S198).

Then, the CPU 1 controls the display section 14 to cancel the print-busy indication and the print request inquiry indications (Step S199).

Then, the CPU 1 sets the flag C to "0" (Step S200) and terminates the manual deletion process routine. Specifically, the CPU 1 reads out the flag C from the EEPROM 6 and rewrite the value "1" to "0" if it is currently "1" while maintaining the same value if it is currently "0".

In Step S197, if the flag C is "1" ("No" in Step S197), on the other hand, it is suspected that the backup data may not have been normally printed. Therefore, the CPU 1 causes the display section 14 to display inquiries to the user about the print results (Step S201). Specifically, the CPU 1 causes the display section 14 to alternately display the two different inquiry indications (see FIGS. 10A and 10B) at a predetermined interval, similarly to the result inquiry process illustrated in FIG. 9.

Then, the CPU 1 determines whether the user has entered a print-OK signal (Step S202). Specifically, the CPU 1 checks whether the user has pressed the No.1 key of the numeral keys at the operation section 13.

If "No" in Step S202, the CPU 1 determines whether the user has entered a print-NG signal (Step S203). Specifically, the CPU 1 checks whether the user has pressed the No.2 key of the numeral keys at the operation section 13.

If "Yes" in Step S203, the manual deletion process proceeds to Step S199 for canceling the print-busy indication and the print request inquiry indications.

If "No" in Step S203, Step S202 follows in a loop to wait for a user's input operation.

In Step S202, if the user makes a print-OK input ("Yes" in Step S202), the manual deletion process proceeds to Step S198 for deleting all of the backup data.

In Step 5196, if all batches or cases of backup data have not been printed out ("No" in Step S196), Step S186 follows in a loop to prepare for printing the next batch of backup data.

In Step S195, if all pages of backup data have not been printed out ("No" in Step S196), Step S186 follows again to prepare for printing a new page of backup data.

In Step S193, if the ink supply mark M has been normally read ("Yes" in Step S193), the manual deletion process proceeds to Step S195 by skipping Step S194 because it is unnecessary to set the flag C to "1".

In Step S190, if the printing of one page of backup data has not finished yet ("No" in Step S190), the printing of the same page is continued by returning to Step S189.

In Step S188, if the count of the dot counter is more than the second threshold ("No" in Step S188), the CPU 1 causes the display section 14 to make an ink run-out indication (Step S204).

Step S204 is followed by Step S205 wherein the CPU 1 sets a printing inhibition mode, which latter step is further followed by Step S200 wherein the CPU 1 sets the flag C to "0".

In Step S187, if there is disturbing light ("Yes" in Step S187), the CPU 1 set the flag C to "1" (Step S206).

Then, the CPU 1 determines whether the count of the dot counter is no higher than the second threshold (Step S207).

If "Yes" in Step S207, the CPU 1 reads out the backup data from the RAM 3 and supplies them to the printing section 12 through the gate array 7 for printing out (Step S208).

Then, the CPU 1 determines whether the printing of one page data is completed (Step S209).

If "Yes" in Step S209, the CPU 1 determines whether all pages of backup data for one batch or case have been printed (Step S210).

If "Yes" in Step S209, the CPU 1 checks whether all batches or cases of backup data have been printed (Step S211).

If "Yes" in Step S210, the manual deletion process proceeds to Step S197 to prepare for subsequent erasion of the backup data.

In Step S211, if all batches or cases of backup data have not been printed out ("No" in Step S211), Step S207 follows in a loop to prepare for printing the next batch of backup data.

In Step S210, if all pages of backup data have not been printed out ("No" in Step S210), Step S207 follows again to prepare for printing a new page of backup data.

In Step S209, if the printing of one page of backup data has not finished yet ("No" in Step S209), the printing of the same page is continued by returning to Step S208.

In Step S207, if the count of the dot counter is more than the second threshold ("No" in Step S207), the manual deletion process proceeds to Step S204.

In Step S186, if the mark flag is not "On" ("No" in Step S186), the manual deletion process proceeds to Step S206.

In Step S184, if the printing of the backup data is not requested by the user ("No" in Step S184), Step S183 follows in a loop to wait for a user's input.

In Step S183, if the user prefers not to print out the backup data ("Yes" in Step S183), the CPU 1 controls the display section 14 to display deletion inquiries (Step S212). Specifically, the CPU 1 controls the display section 14 to alternately display two different inquiry indications at a predetermined time interval, as shown in FIGS. 18A and 18B.

Then, the CPU 1 determines whether the user has entered a delete-OK signal (Step S213). Specifically, the CPU 1 checks whether the user has pressed the No.1 key of the numeral keys at the operation section 13.

If "No" in Step S213, the CPU 1 determines whether the user has entered a Non-delete signal (Step S214) Specifically, the CPU 1 checks whether the user has pressed the No.2 key of the numeral keys at the operation section 13.

If "Yes" in Step S214, the manual deletion process proceeds to Step S199 for canceling the print-busy indication and the print request inquiry indications without erasing the backup data.

If "No" in Step S214, Step S213 follows in a loop to wait for a user's input.

In Step S213, if the user makes a delete-OK input ("Yes" in Step S213), the manual deletion process proceeds to Step S198 for deleting all of the backup data.

Moreover, the CPU 1 determines whether the input operation showing that the backup data can be erased is performed by the user (S213). Specifically, the CPU 1 monitors an operation signal sent from the operation section 13 to check whether the user presses the ten-key "1".

In Step S181, if no backup data is stored in the RAM 3 ("No" in Step S181), the CPU 1 controls the display section 14 to so notify the user (Step S215), and the manual deletion process proceeds to Step S199. Specifically, the CPU 1 causes the display section 14 to display a no-data indication for a period of two seconds for example, as shown in FIG. 19.

In this way, the user has the option of deleting the backup data (fax-received data) in the RAM 3 by suitably operating the operation section 13.

According to the embodiment described above, the operation of the printing section 12 is controlled depending on the mark flag, the backup flag and the presence or absence of disturbing light. However, it is not always necessary to use all of these factors for controlling purposes. For instance, t is possible to use only the mark flag or the combination of the mark flag and the backup flag regardless of the presence or absence of disturbing light.

Further, in the above-described embodiment, the backup data which have been already printed out are automatically deleted from the RAM 3 by a necessary amount at a time only when the RAM 3 becomes full. However, the user may select between an automatic data deletion mode and a non-automatic data deletion mode by operating a key switch at the operation section 13.

The preferred embodiment of the present invention being thus described, it is obvious that the same may be varied in many ways. Such variations should not be regarded as a departure from the spirit and scope of the present invention, and all such variations as would be obvious to those skilled in the art are intended to be included in the scope of the following claims.

What is claimed is:

1. A communication apparatus, comprising:
   a receptacle for containing a print material;
   a receiver for receiving an image through a communication line;
   a printing section for printing the received image on a recording sheet with the print material while also printing a print material supply mark at an edge portion of the recording sheet;
   a detecting unit for detecting the print material supply mark;
   a controller for selecting, in response to a user's operation, a mark-on state in which the printing section is allowed to print the print material supply mark and a mark-off state in which the printing section is prohibited from printing the print material supply mark; and
   a memory for storing the received image, wherein the controller controls the memory to store the received image while the printing section is held in the mark-off state.

2. The communication apparatus according to claim 1, wherein the controller is further capable of selecting, in response to a user's operation performed in the mark-off state, a back-up state in which the memory is controlled to store the received image and a back-off state in which the memory is controlled not to store the received image.

3. The communication apparatus according to claim 1, wherein the print material is an ink which is discharged by an ink jet printhead, the print material supply mark being an ink supply mark.

4. A communication apparatus comprising:
   a receptacle for containing a print material;
   a receiver for receiving an image through a communication line;
   a printing section for printing the received image on a recording sheet with the print material while also printing a print material supply mark at an edge portion of the recording sheet;
   a detecting unit for optically detecting the print material supply mark and for optically detecting disturbing light; and
   a controller for controlling the printing section to perform successive steps of printing the received image on the recording sheet regardless of detection by the detecting unit with respect to the print material supply mark if the detecting unit detects the disturbing light immediately before starting the printing.

5. The communication apparatus according to claim 4, further comprising a memory for storing the received image as backup data, wherein the controller selects a backup-on state and a backup-off state in response to a user's operation, the controller held in the backup-on state controlling the memory to store the received image if the detecting unit detects the disturbing light immediately before starting the printing, the controller held in the backup-on state further controlling the memory not to store the received image if the detecting unit does not detect the disturbing light immediately before starting the printing, the controller held in the backup-off state controlling the memory not to store the received image regardless of detection by the detecting unit with respect to the disturbing light.

6. A communication apparatus comprising:
   a receptacle for containing a print material;
   a receiver for receiving an image through a communication line;
   a memory for storing the received image as backup data;
   a printing section for printing the received image on a recording sheet with the print material while also printing a print material supply mark at an edge portion of the recording sheet;
   a detecting unit for optically detecting the print material supply mark and for optically detecting disturbing light; and
   a controller for controlling the printing section to stop printing the received image while controlling the memory to store the received image if the print material supply mark is not normally detected by the detecting unit in the course of the printing;

wherein the controller controls the printing section to stop printing the received image while controlling the memory to store the received image regardless of detection by the detecting unit with respect to the print material supply mark if the detecting unit detects the disturbing light in the course of the printing.

7. A communication apparatus, comprising:

a receptacle for containing a print material;

a receiver for receiving an image through a communication line;

a memory for storing the received image as backup data;

a printing section for printing the received image on a recording sheet with the print material while also printing a print material supply mark at an edge portion of the recording sheet;

a detecting unit for optically detecting the print material supply mark; and a controller for selecting a backup-on state and a backup-off state in response to a user's operation, the controller also selecting, in response to another user's operation, a mark-on state in which the printing section is allowed to print the print material supply mark and a mark-off state in which the printing section is prohibited from printing the print material supply mark, wherein the controller performs four different control modes in accordance with different combinations of the backup-on state, the backup-off state, the mark-on state and the mark-off state.

8. The communication apparatus according to claim 7, wherein the detecting unit optically detects disturbing light, and wherein the different control modes includes a second control mode performed by the controller which is held in the backup-off state and the mark-on state, the controller held in the second control mode controlling the memory not to store the received image but controlling the printing section to print the received image and the print material supply mark regardless of detection by the detecting unit with respect to the disturbing light, the controller held in the second control mode also controlling the memory to store the received image but controlling the printing section to stop printing the received image and the print material supply mark if the print material supply mark is not normally read by the detecting unit in the absence of the disturbing light in the course of the printing.

9. The communication apparatus according to claim 7, wherein the detecting unit optically detects disturbing light, and wherein the different control modes includes a third control mode performed by the controller which is held in the backup-on state and the mark-off state, the controller held in the third control mode controlling the memory to store the received image and controlling the printing section to print the received image without printing the print material supply mark regardless of detection by the detecting unit with respect to the disturbing light.

10. The communication apparatus according to claim 7, wherein the detecting unit optically detects disturbing light, and wherein the different control modes includes a fourth control mode performed by the controller which is held in the backup-off state and the mark-off state, the controller held in the fourth control mode controlling the printing section to print the received image without printing the print material supply mark and without causing the memory to store the received image regardless of detection by the detecting unit with respect to the disturbing light.

11. A communication apparatus, comprising:

a receptacle for containing a print material;

a receiver for receiving an image through a communication line;

a memory for storing the received image as backup data;

a printing section for printing the received image on a recording sheet with the print material while also printing a print material supply mark at an edge portion of the recording sheet;

a detecting unit for optically detecting the print material supply mark; and a controller for selecting a backup-on state and a backup-off state in response to a user's operation, the controller also selecting, in response to another user's operation, a mark-on state in which the printing section is allowed to print the print material supply mark and a mark-off state in which the printing section is prohibited from printing the print material supply mark, wherein the controller performs four different control modes in accordance with different combinations of the backup-on state, the backup-off state, the mark-on state and the mark-off state, wherein the detecting unit optically detects disturbing light, and wherein the different control modes includes a first control mode performed by the controller which is held in the backup-on state and the mark-on state, the controller held in the first control mode controlling the memory to store the received image in addition to controlling the printing section to print the received image and the print material supply mark if the detecting unit detects the disturbing light immediately before starting the printing, the controller held in the first control mode also controlling the memory not to store the received image but controlling the printing section to print the received image and the print material supply mark while the print material supply mark is normally read by the detecting unit in the absence of the disturbing light in the course of the printing, the controller held in the first control mode further controlling the memory to store the received image but controlling the printing section to stop printing the received image when the print material supply mark is not normally read by the detecting unit in the absence of the disturbing light in the course of the printing, the controller held in the first control mode moreover controlling the memory to store the received image but controlling the printing section to stop printing the received image regardless of detection by the detecting unit with respect to the print material supply mark when the detecting unit detects the disturbing light in the course of the printing.

12. A communication apparatus comprising:

a display section for displaying various kinds of information;

a receptacle for containing a print material;

a receiver for receiving an image through a communication line;

a memory for storing the received image as backup data;

a printing section for printing the received image on a recording sheet with the print material while also printing a print material supply mark at an edge portion of the recording sheet;

a detecting unit for optically detecting the print material supply mark and for optically detecting disturbing light; and a controller for selecting a mark-on state in which the printing section is allowed to print the print material supply mark and a mark-off state in which the printing section is prohibited from printing the print material supply mark;

wherein the controller controls the memory to store the received image in addition to controlling the printing section to print the received image when the mark-off state is selected or when the detecting unit detects the disturbing light immediately before the printing, the controller also controlling the display section to display a print result inquiry after completion of the image reception by the receiver if the received image is stored in the memory, the controller further controlling the memory to delete the backup data in response to a print-OK input by a user.

13. The communication apparatus according to claim 12, further comprising a cleaner for cleaning a supply path for the print material, the controller controlling the cleaner to clean the supply path in response to a print-NG input by the user, the controller also controlling the printing section to print out the backup data after the cleaning.

14. A communication apparatus comprising:
a receptacle for containing a print material;
a receiver for receiving an image through a communication line;
a memory for storing the received image as backup data;
a printing section for printing the received image on a recording sheet with the print material while also printing a print material supply mark at an edge portion of the recording sheet;
a detecting unit for optically detecting the print material supply mark and for optically detecting disturbing light; and
a controller for controlling the memory and the printing unit in accordance with the detection of the detecting unit;
wherein the controller checks a remaining capacity of the memory before storing the received image, the controller also deleting those of the backup data which have been already printed out when the remaining capacity of the memory is found to be no more than a predetermined amount.

15. A communication apparatus comprising:
a receptacle for containing a print material;
a receiver for receiving an image through a communication line;
a memory for storing the received image as backup data;
a printing section for printing the received image on a recording sheet with the print material while also printing a print material supply mark at an edge portion of the recording sheet;
a detecting unit for optically detecting the print material supply mark and for optically detecting disturbing light;
a cleaner for cleaning a supply path for the print material; and
a controller for controlling the memory to store or not to store the received image in accordance with the detection of the detecting unit, the controller further controlling the printing section to print out any remainder of the backup data of the memory on the recording sheet after controlling the cleaner to clean the supply path.

16. The communication apparatus according to claim 15, wherein the controller selects, in response to a user's operation, a mark-on state in which the printing section is allowed to print the print material supply mark and a mark-off state in which the printing section is prohibited from printing the print material supply mark, the controller controlling the memory to store or not to store the received image in accordance with the detection of the detecting unit and the selection of the mark-on state or the mark-off state.

17. The communication apparatus according to claim 15, wherein the controller controls the cleaner to clean the supply path in response to a user's operation.

18. The communication apparatus according to claim 15, wherein the controller controls the cleaner to automatically clean the supply path at a predetermined time interval.

19. The communication apparatus according to claim 15, wherein the print material is an ink contained in an ink cartridge as the receptacle, the controller controlling the cleaner to clean the supply path automatically upon replacement of the ink cartridge.

20. The communication apparatus according to claim 15, wherein the controller controls the memory to delete the stored backup data in a case where no disturbing light is detected by the detecting unit during the printing of the backup data after the cleaner cleans the supply path.

21. A communication apparatus comprising:
a receptacle for containing a print material;
a receiver for receiving an image through a communication line;
a memory for storing the received image as backup data;
a printing section for printing the received image on a recording sheet with the print material while also printing a print material supply mark at an edge portion of the recording sheet;
a detecting unit for optically detecting the print material supply mark and for optically detecting disturbing light;
a cleaner for cleaning a supply path for the print material; and
a controller for selecting, in response to a user's operation, a mark-on state in which the printing section is allowed to print the print material supply mark and a mark-off state in which the printing section is prohibited from printing the print material supply mark, the controller controlling the memory to store or not to store the received image in accordance with the detection of the detecting unit and the selection of the mark-on state or the mark-off state;
wherein the controller held in the mark-on state controls the printing section to print out any remainder of the backup data of the memory on the recording sheet after controlling the cleaner to clean the supply path, the controller held in the mark-off state preventing the printing section from printing out any remainder of the backup data of the memory on the recording sheet even after controlling the cleaner to clean the supply path.

22. The communication apparatus according to claim 21, wherein the controller controls the cleaner to clean the supply path in response to a user's operation.

23. The communication apparatus according to claim 21, wherein the controller controls the cleaner to automatically clean the supply path at a predetermined time interval.

24. The communication apparatus according to claim 21, wherein the print material is an ink contained in an ink cartridge, the controller controls the cleaner to clean the supply path automatically upon replacement of the ink cartridge as the receptacle.

25. The communication apparatus according to claim 21, wherein the controller held in the mark-on state controls the memory to delete the stored backup data in a case where no disturbing light is detected by the detecting unit during the printing of the backup data after the cleaner cleans the supply path.

26. A communication apparatus comprising:
- a display section for displaying various kinds of information;
- a receptacle for containing a print material;
- a receiver for receiving an image through a communication line;
- a memory for storing the received image as backup data;
- a printing section for printing the received image on a recording sheet with the print material while also printing a print material supply mark at an edge portion of the recording sheet;
- a detecting unit for optically detecting the print material supply mark and for optically detecting disturbing light; and
- a controller for controlling the memory and the printing section in accordance with the detection of the detecting section;
- wherein the controller controls the display section to display a print request inquiry for asking a user whether to print out the backup data of the memory, the controller also controlling the printing section to print out the backup data when the user requests so in response to the print request inquiry.

27. The communication apparatus according to claim 26, wherein the controller controls the display section to display a print-busy indication while the printing section prints out the backup data of the memory in response to the user's print request.

28. The communication apparatus according to claim 26, wherein the controller controls the display section to display a print result inquiry for asking the user as to print results after the printing section prints out the backup data in response to the user's print request, the controller further controlling the memory to delete the backup data when the user makes a print-OK input in response to the print result inquiry.

29. The communication apparatus according to claim 26, wherein the controller controls the display section to display a deletion inquiry for asking the user whether to delete the backup data when the user requests no printing of the backup data in response to the print request inquiry, the controller further controlling the memory to delete the backup data when the user requests so in response to the deletion inquiry.

30. The communication apparatus according to claim 26, wherein the controller controls the display section to display a no-data indication when the memory stores no backup data.

31. The communication apparatus according to claim 26, wherein the controller controls the memory to delete the backup data if no disturbing light is detected by the detecting unit while the printing section prints out the backup data in response to the user's print request.

* * * * *